United States Patent
Mishra et al.

(10) Patent No.: US 11,507,552 B2
(45) Date of Patent: *Nov. 22, 2022

(54) PERVASIVE SEARCH ARCHITECTURE

(71) Applicant: Microsoft Technology Licensing, LLC, Redmond, WA (US)

(72) Inventors: Pragyana K. Mishra, Bellevue, WA (US); Nagareddy S. Reddy, Sammamish, WA (US); Mikhail Parakhin, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/128,856

(22) Filed: Dec. 21, 2020

(65) Prior Publication Data

US 2021/0109911 A1    Apr. 15, 2021

Related U.S. Application Data

(63) Continuation of application No. 15/901,020, filed on Feb. 21, 2018, now Pat. No. 10,949,408, which is a
(Continued)

(51) Int. Cl.
*G06F 16/22* (2019.01)
*G06F 16/13* (2019.01)
*G06F 16/9535* (2019.01)

(52) U.S. Cl.
CPC ........ *G06F 16/2228* (2019.01); *G06F 16/134* (2019.01); *G06F 16/9535* (2019.01)

(58) Field of Classification Search
None
See application file for complete search history.

(56) References Cited

U.S. PATENT DOCUMENTS 6,636,854 B2   10/2003   Dutta et al.
7,660,787 B2   2/2010    Borrillo et al.
(Continued)

FOREIGN PATENT DOCUMENTS

CN   101334791 A   12/2008
CN   101785008 A   7/2010
(Continued)

OTHER PUBLICATIONS

"Notice of Allowance and Search Report Issued in Chinese Patent Application No. 201480058391.0", dated Oct. 20, 2021, 8 Pages.
(Continued)

*Primary Examiner* — Wilson Lee
(74) *Attorney, Agent, or Firm* — Calfee, Halter & Griswold LLP

(57) ABSTRACT

A pervasive search architecture that indexes personal content of a querying user and made accessible to the user by other users. A compute node of a personal content location facilitates index generation and serve of the index. The index is generated for personal content stored at the personal content location. For a given content location, the index may encapsulate content stored in a set of locations with access permissions. The indexing application runs periodically at the personal content location and incrementally indexes content that is added to the shared locations. The same application allows the user to configure locations with the desired access permissions for participation in the search.

20 Claims, 17 Drawing Sheets

Related U.S. Application Data continuation of application No. 14/061,000, filed on Oct. 23, 2013, now abandoned.

(56) References Cited

U.S. PATENT DOCUMENTS

| | | | |
|---|---|---|---|
| 7,725,453 | B1 | 5/2010 | Chen et al. |
| 7,987,185 | B1 | 7/2011 | Mysen et al. |
| 7,991,767 | B2 | 8/2011 | Brooks et al. |
| 8,082,242 | B1 | 12/2011 | Mysen et al. |
| 8,359,318 | B2 | 1/2013 | Garbe |
| 8,442,994 | B1 | 5/2013 | Chen et al. |
| 8,468,146 | B2 | 6/2013 | Bhose et al. |
| 9,294,537 | B1 | 3/2016 | Zuccarino et al. |
| 10,949,408 | B2 * | 3/2021 | Mishra ................ G06F 16/134 |
| 2002/0038348 | A1 | 3/2002 | Malone et al. |
| 2005/0289110 | A1 | 12/2005 | Giampaolo et al. |
| 2007/0174815 | A1 | 7/2007 | Chrysanthakopoulos et al. |
| 2008/0140849 | A1 | 6/2008 | Collazo |
| 2008/0168048 | A1 | 7/2008 | Bell et al. |
| 2009/0063448 | A1 | 3/2009 | DePue et al. |
| 2009/0094205 | A1 | 4/2009 | Malone et al. |
| 2009/0198790 | A1 | 8/2009 | Grevers, Jr. |
| 2009/0292814 | A1 | 11/2009 | Ting et al. |
| 2009/0307189 | A1 | 12/2009 | Bobbitt et al. |
| 2010/0262593 | A1 | 10/2010 | Bruno et al. |
| 2010/0280973 | A1 | 11/2010 | Banker |
| 2011/0047136 | A1 | 2/2011 | Dehn |
| 2011/0083167 | A1 | 4/2011 | Carpenter et al. |
| 2011/0087647 | A1 | 4/2011 | Signorini et al. |
| 2011/0143811 | A1 | 6/2011 | Rodriguez |
| 2011/0191318 | A1 * | 8/2011 | Gilbey ................ G06F 16/9535 707/706 |
| 2011/0238830 | A1 | 9/2011 | Giampaolo et al. |
| 2012/0005224 | A1 * | 1/2012 | Ahrens .................. H04W 4/21 707/769 |
| 2012/0158713 | A1 * | 6/2012 | Jin ........................ G06F 16/435 707/728 |
| 2012/0197911 | A1 | 8/2012 | Banka et al. |
| 2012/0290614 | A1 * | 11/2012 | Nandakumar .......... G06F 16/11 707/770 |
| 2013/0144864 | A1 | 6/2013 | Noble et al. |
| 2013/0240473 | A1 | 9/2013 | Harrenstien et al. |
| 2013/0325847 | A1 | 12/2013 | Suchter et al. |
| 2014/0006444 | A1 * | 1/2014 | Gay ...................... G06F 16/245 707/770 |
| 2014/0019443 | A1 | 1/2014 | Golshan |
| 2014/0052584 | A1 | 2/2014 | Gershon et al. |
| 2014/0156648 | A1 * | 6/2014 | Liu ....................... G06F 16/955 707/722 |
| 2014/0172828 | A1 | 6/2014 | Mo et al. |
| 2014/0270407 | A1 | 9/2014 | Balakrishnan et al. |
| 2014/0280107 | A1 * | 9/2014 | Heymans ............ G06F 16/3322 707/727 |
| 2014/0280358 | A1 | 9/2014 | Coalson et al. |
| 2014/0304247 | A1 * | 10/2014 | Fastlicht ............. G06F 16/9535 707/706 |
| 2014/0358882 | A1 | 12/2014 | Diab |
| 2015/0032757 | A1 | 1/2015 | Barykin et al. |
| 2015/0046443 | A1 | 2/2015 | Barkai et al. |
| 2015/0074819 | A1 * | 3/2015 | Borenstein ........... G06F 16/213 726/27 |
| 2015/0112996 | A1 | 4/2015 | Mishra et al. |
| 2015/0153906 | A1 * | 6/2015 | Liao ....................... G06F 16/78 715/709 |
| 2015/0169631 | A1 | 6/2015 | Gu et al. |
| 2015/0227624 | A1 | 8/2015 | Busch et al. |
| 2015/0310100 | A1 * | 10/2015 | Bursey .................. G06F 16/951 707/706 |
| 2017/0140219 | A1 | 5/2017 | King et al. |
| 2017/0242898 | A1 | 8/2017 | Su et al. |
| 2018/0181603 | A1 | 6/2018 | Mishra et al. |
| 2019/0171753 | A1 * | 6/2019 | Teng ...................... G06Q 50/01 |

FOREIGN PATENT DOCUMENTS

| | | |
|---|---|---|
| CN | 102349087 A | 2/2012 |
| CN | 102804202 A | 11/2012 |
| JP | 2010538366 A | 12/2010 |
| WO | 03042874 A1 | 5/2003 |

OTHER PUBLICATIONS

"International Preliminary Report on Patentability issued in PCT Application No. PCT/US2014/060560", dated Jan. 15, 2016, 7 Pages.

"Second Written Opinion Issued in PCT Application No. PCT/US2014/060560", dated Sep. 16, 2015, 6 Pages.

"International Search Report and Written Opinion Received for PCT Application No. PCT/US2014/060560", dated Jan. 29, 2015, 12 Pages.

Michel, et al., "myGander: A Mobile Interface and Distributed Search Engine for Pervasive Computing", In IEEE International Conference on Pervasive Computing and Communications Workshops, Mar. 19, 2012, pp. 495-497.

Mislove, et al., "Exploiting Social Networks for Internet Search", In Proceedings of 5th Workshop on Hot Topics in Networks, Nov. 2006, 6 pages.

Moore, et al., "Multimedia Search and Retrieval over Integrated Social and Sensors Networks", In Proceedings of the 21st International Conference Companion on World Wide Web, Apr. 16, 2012, 6 pages.

"Final Office Action Issued in U.S. Appl. No. 14/061,000", dated Jul. 27, 2017, 15 Pages.

"Non-Final Office Action Issued in U.S. Appl. No. 14/061,000", dated Feb. 26, 2016, 10 Pages.

"Non-Final Office Action Issued in U.S. Appl. No. 14/061,000", dated Nov. 30, 2016, 15 Pages.

"Office Action Issued in European Patent Application No. 14793937.5", dated Jul. 26, 2017, 6 Pages.

"Office Action Issued in European Patent Application No. 14793937.5", dated May 23, 2018, 11 Pages.

"First Office Action and Search Report Issued in Chinese Patent Application No. 201480058391.0", dated Jun. 21, 2018, 10 Pages.

"Second Office Action and Search Report Issued in Chinese Patent Application No. 201480058391.0", dated Feb. 15, 2019, 11 Pages.

"Office Action Issued in European Patent Application No. 14793937.5", dated Mar. 18, 2019, 9 Pages.

"System and Method for Employing Social Networks to Narrow Search Results based on Proximity and Connectivity", In IP.com Journal, May 18, 2012.

"An Interface to allow easier news items search results based on location", In IP.com Journal, Nov. 18, 2010.

"Method and Apparatus for Identifying Search Results Based on Location Information of a User", In IP.com Journal, Jun. 17, 2010.

"Third Office Action Issued in Chinese Patent Application No. 201480058391.0", dated Aug. 5, 2019, 7 Pages.

Office Action Issued in Chinese Patent Application No. 201480058391.0, dated Dec. 3, 2019, 5 Pages.

"Non-Final Office Action for United States U.S. Appl. No. 15/901,020", dated Mar. 6, 2020, 11 Pages.

"Reply to Non-Final Office Action for United States U.S. Appl. No. 15/901,020", filed date: Jul. 8, 2020, 12 Pages.

"Office Action Issued in European Patent Application No. 14793937.5", dated May 6, 2020, 4 Pages.

"Office Action Issued in Indian Patent Application No. 201647009561", dated Aug. 11, 2020, 7 Pages.

"Notice of Allowance and Fees Due for U.S. Appl. No. 15/901,020", dated Sep. 18, 2020, 13 Pages.

"Corrected Notice of Allowability for U.S. Appl. No. 15/901,020", dated Oct. 30, 2020, 2 Pages.

"Corrected Notice of Allowability for U.S. Appl. No. 15/901,020", dated Nov. 12, 2020, 2 Pages.

"Restriction Requirement for U.S. Appl. No. 14/061,000", dated Aug. 27, 2015, 8 Pages.

(56) References Cited

OTHER PUBLICATIONS

"Reply to Restriction Requirement for U.S. Appl. No. 14/061,000", filed date: Oct. 22, 2015, 14 Pages.
"Reply to Non-Final Office Action for U.S. Appl. No. 14/061,000", filed date: Aug. 23, 2016, 9 Pages.
"Reply to Non-Final Office Action for U.S. Appl. No. 14/061,000", filed date: Mar. 30, 2017, 13 Pages.
"Reply to Final Office Action for U.S. Appl. No. 14/061,000", filed date: Sep. 29, 2017, 18 Pages.
"Office Action Issued in Korean Patent Application No. 10-2016-7010565", dated Jul. 28, 2021, 16 Pages.
"Office Action Issued in Korean Patent Application No. 10-2016-7010565", dated Jan. 5, 2021, 15 Pages.
"Office Action Issued in Korea Patent Application No. 10-2016-7010565", dated Jan. 24, 2022, 8 Pages.
"Office Action Issued in Korean Patent Application No. 10-2016-7010565", dated Mar. 29, 2022, 11 Pages.

* cited by examiner

PERVASIVE SEARCH ARCHITECTURE

RELATED APPLICATIONS

This application is a continuation of and claims priority to U.S. Non-Provisional patent application Ser. No. 15/901,020 ("the '020 application"), filed on Feb. 21, 2018, and entitled "PERVASIVE SEARCH ARCHITECTURE", which his hereby incorporated by reference in its entirety. The '020 application is a continuation of and claims priority to U.S. Non-Provisional patent application Ser. No. 14/061,000 filed on Oct. 23, 2013, entitled "PERVASIVE SEARCH ARCHITECTURE," which is hereby incorporated by reference in its entirety.

BACKGROUND

Online search is presently restricted to public documents that are online, which are hosted and made available on servers. Current search engines crawl and index these publicly available documents of the web and generate an index that essentially maps search terms or queries to a list of relevant documents. However, this search index has no access to personal data that reside on personal devices such as hard drives and other data storage devices, storage devices that account for a vast amount of content. Moreover, even if users share their personal data, there are no means to index and make this data available to the searches performed by the users with which they choose to share the data.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a pervasive search model that broadens the amount of relevant content considered for return as search results to a user submitting a query (the querying user) by now also considering directly the user's pervasive network—the storage locations of access-restricted (personal) content stored on the user's personal content locations (e.g., personal devices) and not normally accessible by other users, the access-restricted content of other users enabled for sharing to the querying user, and content directly accessible from other publically available sensor systems such as traffic cameras, outdoor environment monitoring sensor systems, etc., as made accessible to the user based on access criteria.

The search model is "pervasive" in that the search process now extends to personal content, which is well beyond that content which is normally associated with search (i.e., the Internet). This includes the personal content of the querying user and the shared content of friends of the user, for example. The model is pervasive as to personal content of the querying user stored at personal content locations of other user devices as well, such as a personal camera, smartphone, etc., which can also be made accessible for search as permitted by access permissions or other criteria such as physical closeness.

The disclosed pervasive search model enables the search and return of personal content results, using local and/or distributed indexes stored at one or more of the personal content locations (e.g., as may be associated with devices) and potentially accessible sensor systems of the pervasive network. Thus, the overall pervasive search process is distributed by being performed directly in association with the personal content locations, as well as in combination with the search performed by the online search engine(s). However, the online search need not be performed at all when choosing to limit the search to only the pervasive network of personal content locations.

The pervasive search architecture is enabled by compute nodes. Each personal content location of a pervasive network may have an associated compute node. Each personal content location may also have a search engine; however, this is not a requirement. When a query is submitted for processing by a querying user, the query is sent to the online search engine (existing web-based engine(s)) for processing. The online search engine processes the query against its online index of online content, and also submits the query back to the personal content location from which the user is making the query for processing and return of personal content of the querying user and any other personal (e.g., shared) content from the personal content location (of the user or other users).

A "pervasive" search engine (a search engine associated in some way with the pervasive network and/or personal content locations of the pervasive network) receives the query from the web-based search engine or from an application of the personal content location from which a search is initiated and interacts (e.g., passes the query to the compute node, although this may not be required for searching only at the personal content location) with the personal content location compute node to access the compute-node generated index and process the query against the compute-node generated index of personally stored content of the user's personal content location.

It is the compute nodes that serve up the index for query processing by the pervasive search engine, that facilitate query-passing among different personal content locations (e.g., other personal content locations of the user, other personal content location of other users, etc.) and that make the personal content (e.g., shared) available for access. The compute node enables access to the personal content index ("serves" the index) by the pervasive search engine. The pervasive search engine processes the query against the personal content index, and the compute node returns zero, some, or all of the personal content as results to the pervasive search engine.

In furtherance of returning relevant personal content from other personal content locations of the pervasive network, the query received at the personal content location of the querying user (now, the first personal content location) is then sent from the compute node of the first personal content location to a compute node of a second personal content location of a second user who is sharing access to some or all of their personal content with the querying user. The second compute node on the second personal content location has already prepared a second index (or updated version thereof) that includes the personal content (of which shared personal content is a part) and serves the second index of the second personal content location to the compute node of the first personal content location. A pervasive search engine associated with the first personal content location then processes the query against the served index of the second personal content location, and the searched documents are requested from the second personal content location. The compute node of the second personal content location then returns the relevant shared personal results back to the compute node of the first personal content location. The online search results and the pervasive network search results are then presented to the querying user.

In an alternative implementation, a pervasive search engine associated with the second personal content location interfaces to the compute node of the second personal content location (now, the second compute node) and the second compute node serves the second index to enable processing of the query and also serves the personal content results back to the pervasive search engine of the second personal content location, which pervasive search engine then sends the results back to the pervasive search engine of the first personal content location for presentation.

The search application being used by the first personal content location, for example, a browser, then receives the online results back from the online search engine, and the pervasive network results directly from the pervasive search engine of the first personal content location, for presentation.

The compute node of a personal content location comprises an index component and a serve component, which are one or more applications that perform index generation of personal content at a given personal content location and enable access to the index to facilitate return of the associated personal content for the search. The index is generated for a set of content stored at the personal content location (e.g., a device) and which maps tags to a piece of content. For a given personal content location, the index may encapsulate content stored in a set of directories with access permissions. The application(s) for generating the index run periodically at the personal content location and incrementally index data that are added to the shared directories and/or memory partitions, as well for un-shared ("private") data. The same application(s) can be used to enable the user to configure directories with the desired access permissions for participation in the pervasive network search.

The serve component serves the index for queries that are sent to the personal content location and return relevant personal content as the pervasive network search results. The serve component checks the ID (identification) of the user issuing the query (the querying user) and associated access permissions, and then processes the index for data that is to be shared with that user. The serve component then looks for the indexed tags that are relevant for the query and returns the path to the shared personal content that has been shared for the user.

The selectively-networked pervasive compute nodes at different personal content locations (e.g., on different storage devices) serve results for queries issued by the querying user. The selection of compute nodes where a given query will be sent depends on the ID of the user and the user's network of shared data, either the user's own and/or the shared data of friends in the user's pervasive network.

The pervasive search architecture facilitates search index distribution. An index at a compute node may not always have mappings of tags to content—it can be a mapping of tags to a set of other indexes on other devices (or data locations). For a given query that reaches that node (the first node), the node can distribute or forward the query to a set of other personal content locations (e.g., compute nodes of other devices) depending on the access permissions and shared data on those other personal content location. Thus, the query processing can be performed in a parallel fashion on the several pervasive network personal content locations. Likewise, the results from the several personal content locations may be returned to the first node as each shared compute node completes.

Alternatively, or in combination therewith, the query forwarding process of a first compute node can be based on indices "known" by the first compute node (a query distribution node), rather than sending the query to all compute nodes of the pervasive network. Thus, personal content locations (and compute node thereof) on the pervasive network can share index creation data indicating that the personal content location not only has an index of shared information, but also notifies other compute nodes of updates to the index of which any compute node has previously knowledge.

This knowledge can be in the form of analyzing one or more indexes that have been stored (cloned) at the first personal content location (e.g., on a device) and are known by the first compute node as part of index redundancy so failure of a sharing personal content location and/or even another personal content location of the querying user can be readily revived using the cloned index from the first personal content location (and first compute node). Additionally, since the first compute node has content knowledge via a locally stored cloned index of the failed or offline sharing compute node, the first compute node may be able to determine that the content that could be highly relevant and obtained by waiting a short period of time (e.g., seconds) before concluding that this failed compute node (the personal content location) is not timely coming back online to the pervasive network, and should be skipped.

For example, a personal user camera (having a personal content location) can be taken on a day trip (off the home network) to capture numerous images—the camera may be offline to the pervasive network. The camera compute node of the camera indexes all the captured images taken that day and other data stored thereon. However, after arriving home, the camera can be brought online (e.g., via a tethered connection, wireless connection, etc.) to the home network (which can be part of a pervasive network), and the captured images searchable by the querying user. Alternatively, the data of the camera can be made online accessible by removing the storage medium (e.g., flash memory chip) from the camera and connecting (inserting the flash memory chip) the storage medium to a networked home computer (that is online to the pervasive network). The index generated by the compute node and stored on the storage medium is then accessible and searchable to return images (personal content) therefrom for a related query from the home computer.

The compute node can also be applied and operate on sensor systems that utilize hardware sensors to sense physical signals such as environmental conditions of temperature, humidity, pressure, traffic, etc., and convert the signals into data. Other sensor systems can employ cameras that capture image signals of scenes such as traffic movement, street activity, etc. These sensor systems can each employ a compute node to generate indexes of sensed content or data (data "personal" to the sensor system and which may be access-restricted or conditioned to some extent) stored at the system and/or obtained directly from the sensor in realtime, and then serve the index and relevant data/content back to the querying user. Thus, the search can be processed directly to the sensor system to obtain realtime or substantially realtime results, rather than accessing the data from a server some time after the associated event has already occurred.

The sensor system data can be restricted access such that access to its data is allowed only when certain criteria are met. For example, a user will only be allowed access to the realtime data of the sensor system if the user device is within a predefined distance (e.g., one mile, one hundred feet, etc.) of the system. If so, the sensor system then becomes part of the pervasive network for that user and shares some or all of the sensor system personal content until the criteria are (criterion is) no longer met. This capability finds particular use with retail stores that want to push coupons and deals only to users who are within a short distance of the store (a criterion), but not users who are a great distance away and are not likely to come to the store for the deal. Thus, the retailer can be selective as to the groups of people the deals go to and the distance.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
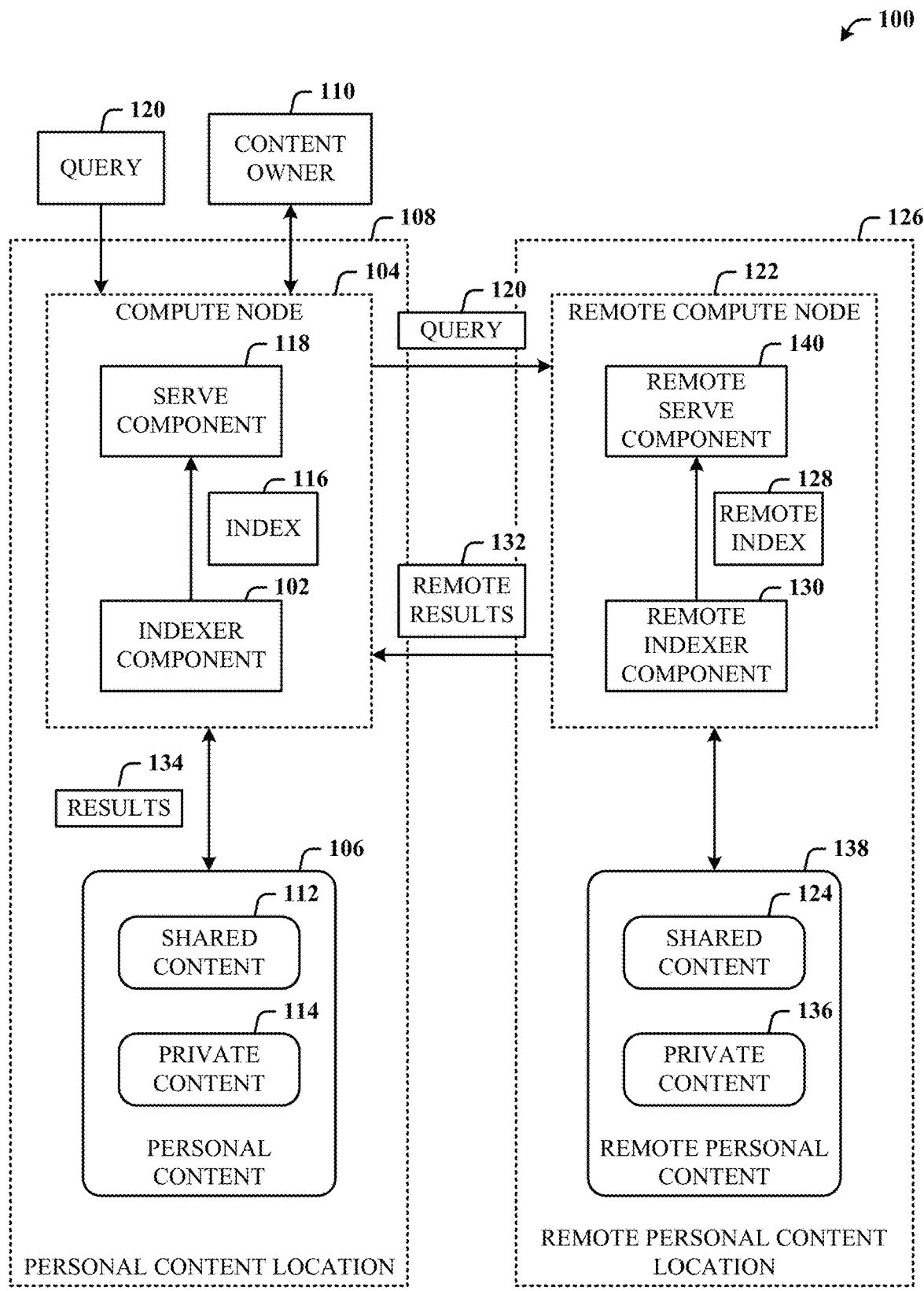
FIG. 1 illustrates a system in accordance with the disclosed architecture.

There is much access-restricted personal content that resides with users, user storage devices, and their social groups, and which is desired to be made available to search. Personal content includes, but is not limited to, photographs, videos, notes, text documents, spreadsheets, application documents (in general), reviews, receipts, coupons, applications, blog posts, podcasts, audio files, music files, emails and other messages, and 3D (three dimensional) models, just to name a few, that is typically not considered in search, but restricted in access, and hence, not typically searched as part of web-based searches.

Personalized data is being generated in increasingly larger amounts on a monthly basis (e.g., 5 GB) by an average user and stored on personal storage, such as on personal storage devices (e.g., internal, attached, etc.) that comprise internal hard drives, external serial devices (e.g., flash drives), and/or cloud storage (e.g., personally managed by the user or other suitable entity on behalf of the user). Moreover, only a fraction of the personal data is being shared (e.g., online or otherwise), with much of the personal data shared through social websites (e.g., Facebook™, Instagram™, Flickr™, YouTube™, etc.). Moreover, a vast amount of the personal data is being generated and stored locally on access-restricted systems such as sensor systems that include cameras (public and user personal) and mobile devices such as smartphones.

The disclosed architecture is a pervasive search model that broadens the amount of relevant content considered for return as search results to a user submitting a query (the querying user) by now also considering directly the user's pervasive network—the personal content storage locations of access-restricted content stored at the user's personal content locations (e.g., personal devices, user's folders, user's directories, etc.) and not accessible by other users, the access-restricted content of other users enabled for sharing to the querying user, and content directly accessible from other publically available sensor systems such as traffic cameras, outdoor environment monitoring sensor systems, etc., as made accessible to the user based on access criteria.

The pervasive search architecture is enabled by compute nodes that operate in conjunction with a personal content location. The compute node at least generates a private index of personal content of the personal content location. When searching both online content and pervasive network content, a query by the user is submitted for processing, the query is sent to the online search engine (e.g., web-based engine(s)) for processing. The online search engine processes the query against its online index of online content, and also submits the query directly to the user personal content location for search processing and return of personal content and any shared personal content. A search engine associated with the user personal content location receives the query and interacts with the compute node to process the query against stored personal content of the personal content location. The compute node enables access to the private index by the search engine. The search engine processes the query against the private index, and the compute node returns personal content as results to the search (this can be referred to as the compute node "serving the index and any associated personal content"). The querying user is then presented not only with the standard web-based online results but also personal content results.

More specifically, the disclosed architecture is a pervasive search paradigm that extends search into personal data that has been made accessible by a user and other users, such as on user device(s) and the devices of other users, private network data sources such as social networks, cloud storage locations, and sensor systems, to name a few, thereby making the personal data of the user and other users indexable and searchable. The architecture enables sharing and search of personal data at a peer-to-peer level. An index created for each set of personal data at a personal content location, is held private by the user (owner) of the data and also holds the access permissions for all other users to that data. The access permissions can be stored separately from, but in association with, the index, stored for groups of index items, and/or stored on an item-by-item basis for each item of the index.

The pervasive search model as described herein focuses on the use of pervasive search engines that are engines other than the web-based search engines (e.g., Bing™); however, this is not to be construed as a limitation in that a web-based search engine could be employed in whole or in part to facilitate pervasive network search.

The pervasive architecture includes selectively networked (e.g., accessible through the Internet, enterprises, peer-to-peer connections, etc.) compute nodes to generate indexes and make the indexes accessible for queries along with results of the queries (also referred to as "serving" the index and the resulting content). The pervasive search model makes personal data (content) available for search and retrieval by indexing and serving the personal data to users with suitable permissions to access the personal (and shared) data.

The personal content made available by a user can include documents stored according to restricted access on the web, personal content of the user on one or more local devices/systems of the user, and personal content shared by other users in the user's pervasive (personally accessible) network. Personal content includes, but is not limited to, photos, videos, text documents, spreadsheets, audio, receipts, coupons, music, podcasts, emails, notes, applications, 3D models, blog posts, etc., any or all of which can be indexed and made available for querying by the user.

The personal content may include data on mobile devices such as cellular telephones, smartphones, tablets, for example, as well as Internet-connected cameras that can index (on-the-fly—in realtime) and serve data for search, browse, and discovery to selected users in the content-owner's pervasive network. The Internet-connected public cameras are part of a larger set of sensor systems that typically send data to databases for subsequent access; however, the data from these sensor systems can now be made available to a given user via the pervasive network, in realtime, as obtained directly from the sensor system based on access criteria.

The indexes can be generated using any available indexing technique such as inverted indexes, for example, for personal content at a personal content location (e.g., on a device) for the purpose of serving the personal documents to queries issued outside the device. Tags and other properties of documents are perused and indexed to making the documents available for queries issued by other users on different devices.

The pervasive network comprises compute nodes that provide the capability to index personal content and serve the index and personal content to a query issued by the user. The compute node is essentially code that operates on a device to not only generate the index of content stored at the personal content location, but to also update the index when new and updated content received. The compute node has an index component (also called an indexer) that generates an index for (pointers to) all shared and non-shared content at the personal content location, and a serve component that serves the generated index and results (personal content of the user and/or other users) for queries directed to that personal content location. The queries may be issued by the owner of the content or by other users in the pervasive network of the owner, which includes friends in the user's social circle or other users, for example, to which the owner has made the content available.

With respect to publicly-searchable personal content of a content owner, if the content owner opts to make any piece of the personal content available to everyone, any pertinent query issued by a user may be able to retrieve that piece of content. However, the personal content retrieval can be controlled by taking into account other factors (criteria) that must be met before access is allowed (pulled by the user) and/or the personal content is pushed to the user. These factors include, but are not limited to, the physical proximity of the user issuing the query, degrees of separation (in the social network) between the content owner and query-issuing user, quality measure and relevance of content, confidence measure of content owner, etc.

The physical proximity of the user includes determining the geographical location of the user relative to a business (or other entity of interest such as a park, restaurant, etc.), since it may be more beneficial to notify and/or entice the user to the business location if the user is relatively close to the business and not of a distance away that the user is unlikely to travel. The physical proximity in combination with preferences of the user such as indicating the desire to purchase a specific product can affect distance of the physical proximity employed for a specific access to the content and/or push of the content to the user. The proximity can also be social distance such as how far down the list of "friends" is a specific user that will be allowed to access another's content—is the remote user a friend, or a friend of a friend, etc. Proximity can be by category such that for example, "only other users who are skiers", or "only employees of Microsoft", "belong to the same club", etc.

The confidence measure of the content owner relates to the likelihood that the content owner will have content relevant to the query. For example, the confidence measure of a content owner who only handles text is low or unlikely to be serving content for a query related to pictures. In contrast, if the content owner is a photographer, the confidence measure is higher that the owner will have images related to the query.

The quality measure can relate to the ability of the content owner to provide the desired level of quality of the content. For example, the quality measure of a content owner who only stores low resolution images is low or unlikely to be serving content for a query related to pictures of a much higher resolution. In contrast, if the content owner is a photographer, the quality measure is higher that the owner will have high resolution images related to the query for such images.

The degree of separation is similar to the social proximity aspect which identifies how socially close or how socially distant is a sharing user. If the sharing user has a larger degree of separation (e.g., a distant user who may be a friend of a friend of a friend of a friend, etc.) from the querying user or a sharing content owner, then the associated content of the distant user may not be as relevant. Similarly, if the sharing user has a lower degree of separation (a closer user who may be a friend of a friend), the associated personal content may by more relevant to the query.

This approach enables retailers and business owners to share coupons, advertisements, and photographs of merchandize, for example, in realtime, for consumers searching or querying for information in the proximate area. In this way, content owners do not have to publish their content and wait for the online crawlers to index and serve the content— the content owner can push the content immediately to the user or enable the user device to immediately pull the owner content.

The compute nodes can be distributed nodes that forward a received query to other compute nodes and then aggregate retrieved documents from those nodes. A compute node can redirect a user query to other compute nodes that generate and serve indexes for query processing, and then serve (return) the relevant results. The compute node then aggregates and sends the aggregated content along with the associated content attributes to the compute node that issued the query.

With respect to local caching and distribution of indexes, indexes, which map tags to content, can be passed between devices with updates to the location of the content. This enables a distributed cache of indexes by which a piece of content can be accessed through queries routed through different devices or nodes of the network. In context of the device and the cloud, possible indexing schemes include: a scheme where the index stays at its associated personal content location (e.g., a machine or on the machine) and the query is sent to the machine, and a scheme where indices are merged into a primary cloud-based index accessible by a personal content location (e.g., a device).

The retrieved personal content can be ranked alongside web content, depending on the user preference and confidence in the user's pervasive network as compared to the web. External storages devices, for example, that do not have a compute node and may not connect to a pervasive search engine can still be accessed and searched for personal content made available. For example, a personal content location associated with a home computer may have a compute node and associated search engine, as well as several external (e.g., universal serial bus—USB) storage devices such as hard drives, flash drives, etc. The externally connected storage devices may not include compute nodes; thus, while these storage devices are not directly connected to the network, the home computer is, and can facilitate indexing and query processing of these external devices to obtain relevant content stored thereon.

Additionally, devices/systems/personal content locations that cannot or do not connect to an online (web-based) search engine can still access and search personal content made available to such devices. In other words, the disclosed architecture also finds applicability to "non-online", or private networks, such as intranets, enterprise networks, home networks, etc. Thus, the pervasive network can extend to any one or more of the devices/systems/personal content locations on the private network, without extending search to the web (or online networks).

Cloud compute nodes can index and serve personal documents for queries. The pervasive search model extends across all personal content whether locally available on personal devices/hard drives or available in the cloud. Running a compute node that accesses content at a personal content location in the cloud—whether the compute node applications run on a personal machine, a sensor system, or on a cloud server—makes content in the cloud searchable and accessible to multiple users (depending on the permissions granted by the content owner).

In the case where the personal content locations associated with the devices, hard drives, or other storage devices are off the network, the content may be cached in the cloud with the same indexes and pervasive network permissions so that users can still search and have the same experience as if the personal content locations associated with the devices, hard drives, or other storage devices were available on the pervasive network.

The pervasive search model also enables selective data access for queries or personalized index serve. The content owner/publisher can define and restrict who can access and query for the content by selectively allowing users to access the content. This enables a retrieval and ranking system that can be influenced by the content owner for queries issued by users in the owner's pervasive network.

The pervasive search model enables indexed and searchable realtime data that is automatically generated by sensor systems, as described herein above. Sensor data that is being generated in realtime can be tagged and indexed by a compute node's index generation component on the sensor system. Thus, these sensor systems can be accessed directly (in contrast to obtaining the sensor data stored in a database server) based on indexes which can be served immediately by the index serve component and made available for incoming queries.

This circumvents the need to host and serve the data on a server. As an example, a temperature sensor installed in a public space, such as "Bellevue City Center", can read the temperature and update a locally stored document with the address tag, "Bellevue City Center" and "temperature" tag; the document may be indexed on the sensor system and served to all suitable users. Any query for the "Bellevue City Center temperature" may be served the temperature value immediately (directly from the temperature sensor system), thus circumventing the need to upload and store the data on a server and subsequently index the data in realtime.

The same example can be applied to sensor systems such as traffic cameras, cameras installed in shopping aisles (for realtime inventory search), realtime bus transit locations and schedules, sensor systems (e.g., proximity such as defined by a geofence) that when triggered issue chefs specials on restaurant menus and "lightning" deals/coupons (time-bound deals), personal content updates, for example, photographs and blogs, and any realtime or quasi realtime personal data.

The pervasive search architecture scales for search of realtime and/or quasi-realtime data in contrast to existing systems that cannot scale to data that is being constantly updated. As an example, consider a pet-monitoring camera at home that continuously saves the last few images of the pet cat on a hard drive that is accessible to the pervasive network. If the user queries for "my cat" at any personal content location (e.g., a device), anywhere, the user receives and views those images retrieved by pervasive search, since that data is indexed and served on-the-fly. There is no existing custom content feed that identifies a new piece of content to be added to the index based on content uploaded or explicitly identified by a user. Moreover, the pervasive search system enables effective querying of data generated by the Internet of "things" (e.g., non-user generated content, but from sensor systems such as weather cameras, etc.), and not just content generated by people.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 includes an indexer component 102 of a compute node 104 associated with a personal content 106 of a personal content location 108 of a content owner 110.

The personal content location 108 can be generally described as relating to devices, systems, and/or accounts over which the content owner 110 exercises some degree of control of the personal content 106 stored in association therewith, and the personal content 106 as relating to the devices, systems, and/or accounts. Thus, the personal content location 108 includes, but is not limited to, personal wired and/or wireless devices such as personal computers, tablet computers, laptops, smartphones, personal servers, and private networks (e.g., home, business, etc.), as well as access-restricted accounts of personal content locations on the Internet ("in the cloud"). The personal content 106 can be stored on one or more storage devices of the personal storage location 108 such as internal hard drives, externally attached drives such as flash drives and hard drives, and network drives (e.g., home, private, cloud etc.), for example.

The system 100 is illustrated in a head-to-head configuration of two personal content locations interacting directly with each other; however, it is to be understood that the disclosed architecture provides the capability to perform pervasive search over many different personal content locations and sharing users.

The personal content 106 can include some accessible content (referred to as shared content 112) authorized for access by authorized users, and other content (referred to as private content 114) that is entirely access-prohibited to users other than the content owner 110 (only accessible by the content owner 110).

The indexer component 102 is configured to generate a content index 116 of the personal content 112 of the personal content location 108. The index 116 can include not only the personal content 106 but the permissions associated with the private content 114 and the shared content 112. Thus, processing of the content index 116 by a pervasive search engine results in handling the indexed content accordingly—only the shared content 112 is allowed to be accessed by other compute nodes of other authorized users/systems, and the private content 114 can be accessed only by the content owner 110 and/or associated content owner systems.

A serve component 118 of the compute node 104 is configured to send (receives and forwards) a query 120 to a remote compute node 122 associated with remote shared personal content 124 of a remote personal content location 126. The personal content location 108 is configured to process the query 120 using the index 116, and the remote personal content location 126 is configured to process the query 120 using a remote content index 128 generated by the remote compute node 122 (more specifically, a remote indexer component 130). The serve component 118 (of the compute node 104) is configured to receive remote results 132 of the remote shared personal content 124 from the remote compute node 122.

Results (e.g., results 134) may also be generated from the personal content location 108. The remote results 132 from the remote compute node 122 and the results 134 generated from processing the query 120 at the personal content location 108, are then combined (e.g., aggregated and ranked) in one or more of various possible ways for presentation with web-based results, as described in greater detail hereinbelow (e.g., intermixed, as separate groups of remote results 132 and results 134, etc.). Presentation can be to the user issuing the query 120 (e.g., the content owner 110) via a browser application.

Note that the remote compute node 122 of the remote personal content location 126 can have the same components as the personal content location 108, and operates in the same way. For example, the remote indexer component 130 generates the remote content index 128 of at least the remote shared personal content 124 and remote private content 136 of the remote personal content 138. The remote index 128 can also include access permissions with each index entry so as to readily determine which of the remote personal content 138 is accessible as the remote shared personal content 124 and which is not (remote private content 136). The remote index 128 is then served up for query processing via a remote serve component 140. Provided the content owner 110 has permitted the shared personal content 112 to be accessed by the remote personal content location 126, as the index 116 is served up by the serve component 118, a query processed by the remote personal content location 126 can then access the shared personal content 112 based on processing of the index 116.

The query processing at the personal content location 108 may be more extensive than query processing at the remote personal content location 126, when the remote personal content location 126 is not of the content owner 110 but of a different content owner. This is because query processing over personal content 106 of the content owner 110 at the personal content location 108 reaches into the private content 114 as well as the shared content 112, whereas query processing at the remote personal content location 126 of a different content owner, as initiated by the content owner 110, is restricted to only the remote shared personal content 124 that the different content owner has permitted for sharing.

However, as is described hereinbelow, if the remote personal content location 126 is also "owned" by the content owner 110, then query processing at the remote personal content location 126 reaches into the remote private content 136 as well, based on the permissions of the remote index 128 that enable access by the content owner 110 to all of the remote personal content 138 of the remote personal content location 126.

The compute nodes, and associated devices, systems, accounts having such compute nodes, are described as being part of a pervasive network, where the given compute node is enabled by the user. In other words, the content owner 110 can be given the capability to disable the compute node, when desired. Thus, when disabled, the compute node (device, system, accounts) drops off the pervasive network until re-enabled. The devices, systems, and accounts, for example, that choose to consider the associated personal content as part of the query and search process, utilize the disclosed compute node architecture.

Put another way, the remote shared personal content 124 is personal content of a remote shared content owner (e.g., other user, same as the content owner 110, other system, etc.). The personal content 106 of the content owner 110 is held private from a public user (or system) and the remote shared personal content 124 of the remote shared content owner is enabled (e.g., by permissions) to be accessed by the compute node 104 of the content owner 110.

The content index 116 can distributed at one or more other personal content locations such as the remote personal content location 126, for example. The content index 116 is generated and updated in realtime at the personal content location 108 of the content owner 110. Changes to data at the personal content location 108 can be detected and cause an update process to be triggered to update the content index 116.

The remote content index 128 can be made publicly-accessible to a public user (or system) based on access criteria. The remote shared personal content 122 can be accessed by the public user (or system) based on criteria that comprises at least one of proximity of the public user issuing the query to the remote personal content location 126, degree of separation between the remote personal content location 126 and the public user, quality measure and relevance of the remote shared personal content 124, or confidence measure of a remote shared content owner of the remote shared personal content 124.

The remote personal content location 126 can comprise a sensor system (e.g., weather station, traffic camera, street camera, etc.) configured to generate realtime sensor data that is indexed in realtime to create a realtime sensor index as the remote content index 128. The sensor system comprises the remote compute node 122 configured to, in part, serve the realtime sensor index for search using the query 120 to return the remote results 132 to the compute node 104.

The remote compute node 122 comprises a remote indexer component 130 and a remote serve component 138. The remote indexer component 130 is configured to generate the remote content index 128 and the remote serve component 138 is configured to serve the remote content index 128 to a search engine (not shown) to generate the remote results 132 based on the query 120. The remote serve component 138 is configured to receive the remote results 132 from the search engine and return the remote results 132 to the serve component 118 of the compute node 104.

The serve component 118 is configured to serve the content index 116 for processing of the query 120 at the personal content location 108, and personal content 106 of the content owner 110 and remote shared personal content 124 of the remote personal content location 126 are presented with web search results at the personal content location 108. The compute node 104 is configured to forward the query 120 to other compute nodes of other personal content locations and, as well as aggregate and rank retrieved other content results from the other compute nodes with personal content results 134 of the personal content location 108.

Figure 2:
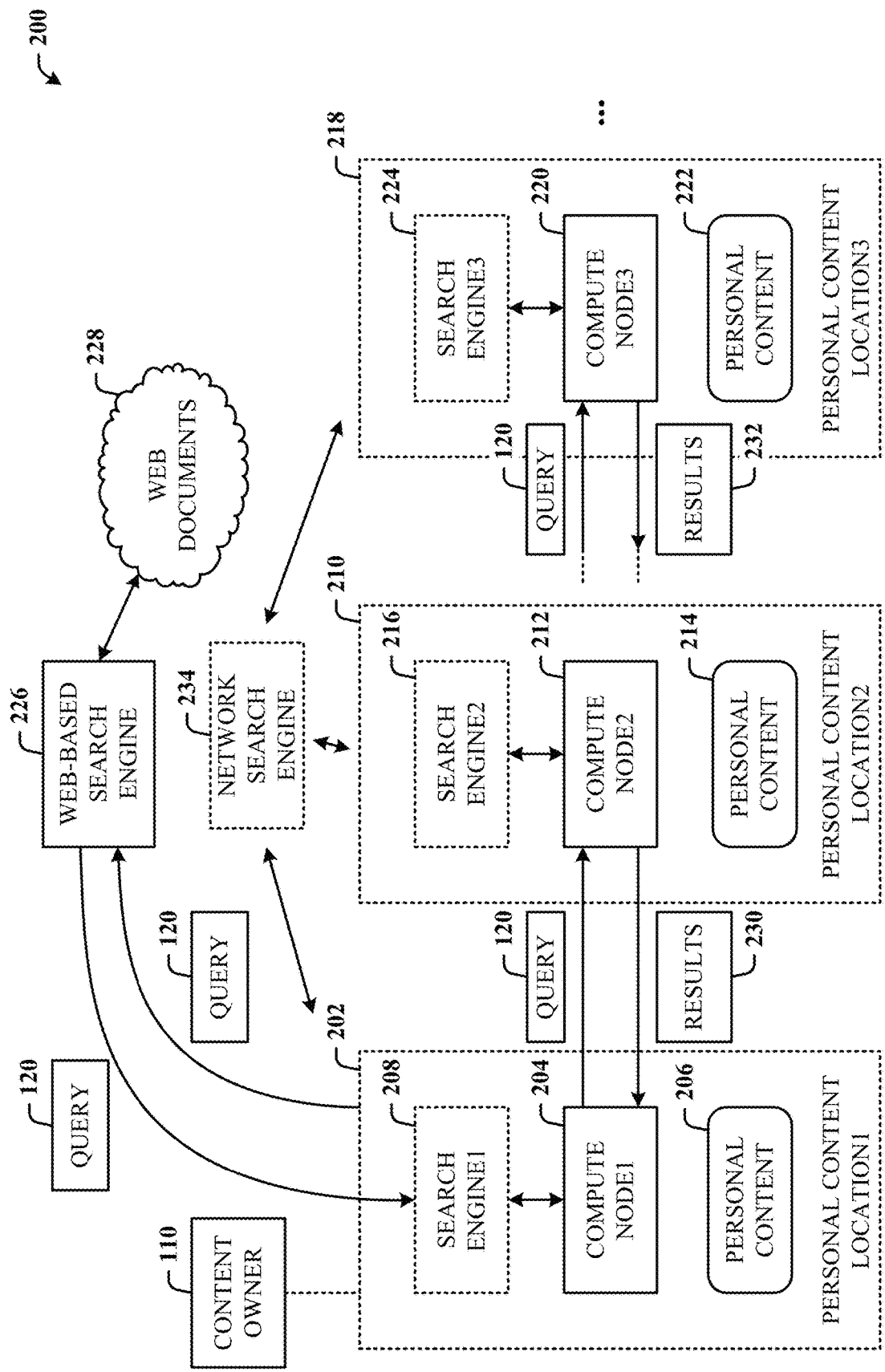
FIG. 2 illustrates a system that addresses the use of search engines with compute nodes and pervasive networks.

FIG. 2 illustrates a system 200 that addresses the use of search engines with compute nodes and pervasive networks. Search engines can be employed in various ways. Any one or more of the personal content locations (e.g., personal content location 108 and remote personal content location 126 of FIG. 1) of the pervasive network can include search engines (the programs and instructions that typically enable the query and search of data and content); however, no personal content location needs to have a search engine. Devices and systems typically have search engines that may be used for local device/system searches, and applications (e.g., browsers) that enable query processing and search interaction with networks (e.g., private and public). These same search engines and applications can be enabled to operate with the compute nodes.

The description for system 200 focuses on the use of "pervasive" search engines—those search engines that may reside at or be associated with the personal content locations that include compute nodes, and hence, may be considered part of the pervasive network (i.e., personal content locations of networks having compute nodes enabled for search), and/or as a separate (non-compute node) search engine on a network that facilitates search in support of the personal content locations of the pervasive network. (Note that it is within contemplation of the disclosed architecture that in a robust implementation, web-based search engines such as Bing™, for example, can be configured to support and perform pervasive search as described herein.)

In a first implementation, each personal content location has its own search engine. For example, a first personal content location 202 (similar to personal content location 108 of FIG. 1) has a first compute node 204, first personal content 206, and a first pervasive search engine 208, a second personal content location 210 (similar to personal content location 108 of FIG. 1) has a second compute node 212, second personal content 214, and a second pervasive search engine 216, and a third personal content location 218 (similar to personal content location 108 of FIG. 1) has a third compute node 220, third personal content 222, and a third pervasive search engine 224. The pervasive search engines (208, 216, and 224) are shown in dotted lines to indicate as optional blocks for purposes of this overall description of the system 200.

As similarly described above in the head-to-head configuration of FIG. 1, the query 120 issued by the content owner 110 (via program(s) of the first personal content location 202) to a web-based search engine 226 is processed at the web-based search engine 226 for web documents 228.

The query 120 is also passed back to the first pervasive search engine 208 (since the content owner 110 issued the query 120) of the first personal content location 202 for query processing (e.g., concurrently with the web-based search) on the pervasive network of content locations (202, 210, and 218) and corresponding compute nodes (204, 212, and 220). The first pervasive search engine 208 processes the query 120 against an index (not shown) of the first personal content 206 provided by the first compute node 204 and returns zero, some, or all of the first personal content 206 as results for presentation with the web-based results.

The first pervasive search engine 208 passes the query 120 to the first compute node 204, which forwards the query 120 to the compute node(s) of any one or more other personal content locations, designated as part of the pervasive network for the content owner 110. Here, both the personal content locations (210 and 218) are part of the pervasive network. Accordingly, the second compute node 212 receives the query 120 and sends the query 120 to the second pervasive search engine 216, which processes the query 120 against an index (not shown) of the second personal content 214 to return zero, some, or all of the second personal content 214 as results 230 to the second compute node 212, which returns the results 230 back to the first compute node 204 and then the first pervasive search engine 208 for presentation with the web-based results.

If the second personal content location 210 is "owned" (exercises control over) by the content owner 110, results 230 returned to the first compute node 204 can be obtained from both shared content and private content of the second personal content 214. If the second personal content location 210 is "owned" by a different content owner of the pervasive network, results 230 returned to the first compute node 204 are obtained from only the shared content (as permitted) of the second personal content 214.

Similarly, the first compute node 204 passes the query 120 to the third compute node 220. (This is indicated using the dotted and solid arrows in both directions, thereby not communicating through the second personal content location 210, but over a network or peer-to-peer connection, although this may be performed as a "proxy" implementation.) The third compute node 220 receives the query 120 and sends the query to the third pervasive search engine 224, which processes the query 120 against an index (not shown) of the third personal content 222 to return zero, some, or all of the third personal content 222 as results 232 to the third compute node 220, which then returns the results 232 directly (e.g., peer-to-peer, wired/wireless network, etc.) back to the first compute node 204 (indicated by the dotted-solid arrow) and then the first pervasive search engine 208 for presentation with the web-based results.

As before if the third personal content location 218 is "owned" by the content owner 110, results 232 returned to the first compute node 204 can be obtained from both shared content and private content of the third personal content 222. If the third personal content location 218 is "owned" by a different content owner of the pervasive network, results 232 returned to the first compute node 204 are obtained from only the shared content (as permitted) of the third personal content 222.

Note that although showing the first compute node 204 connecting directly to the second compute node 212, which can be performed via peer-to-peer (short range wireless (e.g., Bluetooth™) and wired communications, the connection can also be accomplished through a wired/wireless network. This applies as well to communications between the first personal content location 202 and the third personal content location 218.

In an alternative implementation, the first pervasive search engine 208 of the first personal content location 202 can not only search its own first personal content 206 but also the personal content of one or more other personal content locations such as second personal content 214 and/or third personal content 222. In this alternative implementation, the second index of the second compute node 212 may be served to the first compute node 204, and therefrom to the first pervasive search engine 208 for query processing. The first pervasive search engine 208 then requests the results, as derived from the second index, through the first compute node 204 and to the second compute node 212, which requested results are obtained from the second personal content 214. The results 230 are then handled as previously described based on if the owner 110 owns the second personal content location 210, or not. The same process follows for other personal content locations of the pervasive network.

In yet another alternative implementation, the search engine is hosted on the pervasive network (a pervasive network search engine) to handle the pervasive network querying processing. In other words, the pervasive network search engine does not need to reside at any of the personal content locations (202, 210, and 218). This implementation can apply to home networks, for example, or other private networks, such as enterprise networks, etc.

Consider a pervasive network search engine 234 such as on a home network node without personal content (although this is not a requirement). The pervasive network search engine 234 can then receive the query 120 from the first compute node 204 and then process the query 120 against the index generated from the first compute node 204 to return results from the first personal content 206 to the first compute node 204 (or retain the results at the pervasive network search engine 234).

The first compute node 204 forwards the query 120 to the second compute node 212 and the second compute node 212 passes the query 120 to the pervasive network search engine 234, which then processes the query 120 against the index of the second compute node 212. The results from the second personal content 214 are then returned to the first compute node 204 (or retained at the pervasive network search engine 234). This can continue as well for the third personal content location 218, which may be a cloud location (without a search engine). The pervasive network search engine 234 runs the query 120 against a cloud index generated by a cloud compute node (e.g., compute node 220) at the cloud personal content location (e.g., third personal content location 218). The results from the third personal content 222 are then returned to the first compute node 204 (or retained at the pervasive network search engine 234).

The results stored at the pervasive network search engine 234 or at the first compute node 204 can now be further processed by the pervasive network search engine 234 for aggregation and ranking with web document results and presentation to the content owner 110.

Alternatively still, the network search engine 234 can be given a list of pervasive network personal content locations (e.g., 202, 210, and 218) to run the query 120 against the corresponding location indices. Thus, query passing is not via one compute node to another compute node but directly to the pervasive network search engine 234. The results can then be passed back to the first personal content location 202 for presentation processing by a browser in combination with web document results.

In yet another variation, the web-based search engine 226 receives the query 120, the list of pervasive network personal content locations (202, 210, and 218) to be accessed, and forwards the query to the corresponding personal content location search engines (208, 216, and 218) and/or the pervasive network search engine 234 for processing. Essentially, any search engine of a personal content location can be utilized to process the query as long as the query issuer is known—the source of the query is known so that the results are sent to the proper query originator. This offloads the query processing from the web-based search engine 226 to other pervasive (or pervasive network) search engines, although this need not be a requirement.

A personal content location in the cloud (e.g., the third personal content location 218) can be handled as with other personal content locations of the pervasive network, since the cloud personal content location has a compute node (e.g., the third compute node 220), and operates like other compute nodes of the pervasive network, and according to any of the previously described alternatives and variations.

For example, where the query 120 is issued from the first personal content location 202 and the cloud personal content location (e.g., the third personal content location 218) lacks a search engine, the cloud index (e.g., the index of the third personal content location 218) generated by the cloud compute node (e.g., the third compute node 220) can be sent to the first personal content location 202 for processing by the first pervasive search engine 208. The first pervasive search engine 208 can then request the results from the cloud personal content (e.g., third personal content 222) via the first compute node 204 communicating to the cloud compute node (e.g., the third compute node 220), and the cloud compute node returns the results (e.g., results 232) to the first compute node 204.

Alternatively, the cloud index stays at the cloud personal content location and the first pervasive search engine 208 runs the search process over the network to the cloud location index and the results are returned back through the cloud compute node to the first compute node 204.

Still alternatively, the cloud index stays at the cloud personal content location and the first compute node 204 sends the query 120 to the cloud compute node, which then sends the query 120 to the cloud search engine (e.g., the third pervasive search engine 224) to process the query 120 against the cloud index and return results from the cloud personal content to the cloud compute node and therefrom to the first compute node 204 and the first pervasive search engine 208 for aggregation, ranking, and presentation.

Figure 3:
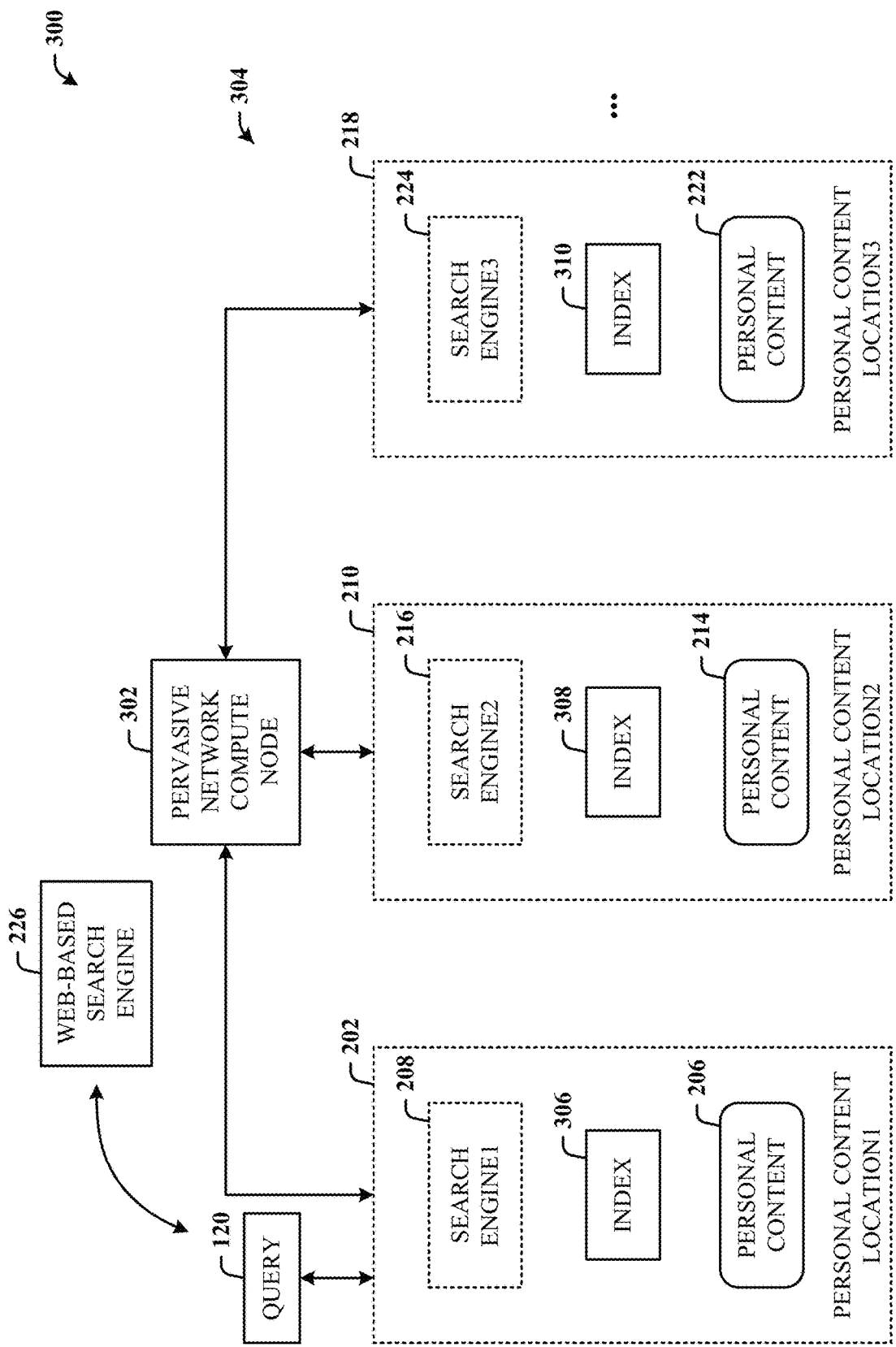
FIG. 3 illustrates an alternative pervasive network system where a pervasive network compute node performs compute node operations for one or more personal content locations.

FIG. 3 illustrates an alternative pervasive network system 300 where a pervasive network compute node 302 performs compute node operations for one or more personal content locations 304. For example, the private network compute node 302 (similar to compute node 104 of FIG. 1) generates a first index 306, a second index 308, and a third index 310 for the corresponding personal content (206, 214, and 222) of the respective personal content locations (202, 210, and 218) of FIG. 2. Although showing the indexing of a subset of the personal content locations 304, alternatively, the pervasive network compute node 302 can be designed to handle all compute node operations for all of the personal content locations 304.

In operation, as before, the originator (content owner) of the query 120 indicates the access rights to the shared content of the personal content (e.g., 214) of any other personal content location (e.g., 210 and 218) via the index 306. The pervasive network compute node 302 processes the index 306 and handles access to the shared and private content of the personal content locations (210 and 218). Results are then passed back through the pervasive network compute node 302 to the first personal content location 202. Alternatively, the results can be passed over the network between the search engines (e.g., second pervasive search engine 216 to the first pervasive search engine 208), or by other application means. Once the web-based and pervasive network results are received back at the first personal content location 202, results processing is performed as before by the first pervasive search engine 208 for aggregation, ranking, and presentation of both the web-based results and pervasive network results.

The pervasive network compute node 302 can be located on a separate network machine such as a server of a home network, or at one of the personal content locations to handle compute node operations for one or more of the other personal content locations 304.

The following description describes pervasive search alternatively in terms of devices rather than personal content locations. However, this is not to be construed as limiting in anyway.

Figure 4:
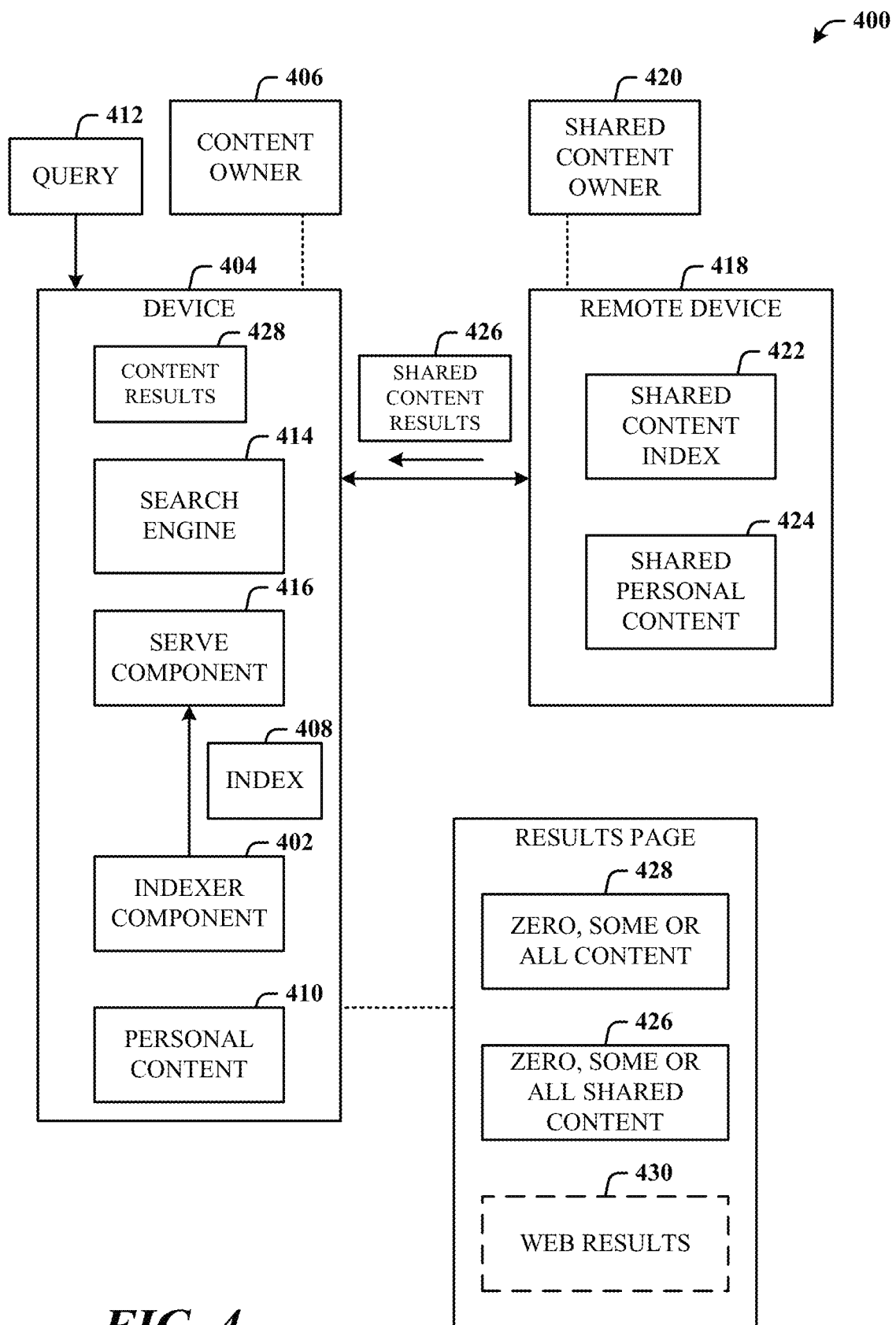
FIG. 4 illustrates an alternative system in accordance with the disclosed architecture.

FIG. 4 illustrates a system 400 in accordance with the disclosed architecture. The system 400 can include an indexer component 402 of a device 404 of a content owner 406 that generates an index 408 that resides on the device 404 (a "local" index) of personal content 410 of the device 404 for processing of a query 412 received by a pervasive search engine 414 of the device 404.

A serve component 416 (of the device 404) sends the query 412 to a remote device 418 of a shared content owner 420 for processing against a shared content index 422 of shared personal content 424. The remote device 418 enables access by the device 404 to the shared personal content 424 of the remote device 418 as indexed according to the shared content index 422. The shared personal content 424 of the remote device 418 is accessible by the device 404 (the content owner 406) based on a permission (access credentials) associated with the content owner 406. The serve component 416 receives shared content results 426 from the remote device 418 based on processing of the query 412 against the shared content index 422 (by a pervasive search engine of the remote device 418) and personal content results 428 of the device 404 based on processing of the query 412 against the index 408 by the pervasive search engine 414.

The personal content 410 of the content owner 406 is personal content of the content owner 406, and the shared personal content 424 of the shared content owner 420 is personal content of the shared content owner 420. The personal content 410 of the content owner 406 is held private from a public user and the shared personal content 424 of the shared content owner 420 is enabled to be accessed by the content owner 406.

The index 408 can be made viewable to a public user to indicate to the public user that the owner of the index may have a certain document type or content but then prohibit access to obtain the document. The document is only accessible after paying some fee, for example.

The index 408 can be distributed on one or more other devices (e.g., the remote device 418). The index 408 can be generated in realtime on the device 404 of the content owner 406.

The shared content owner 420 can enable the shared content index 422 to become a public index that is searchable by a public user based on access criteria. As before with personal content locations, the shared personal content 424 accessed by the public user can be based on criteria of at least one of proximity of the public user issuing the query to the remote device 418, degree of separation between the shared content owner 420 and the public user, quality measure and relevance of the shared personal content 424 of the shared content owner 420, or confidence measure of the shared content owner 420.

The remote device 418 can be a sensor system that generates realtime sensor data that is indexed in realtime to generate a realtime sensor index (e.g., the shared content index 422). The sensor system comprises a sensor system serve component (similar in capability to the serve component 416) that serves the realtime sensor index for search using the query 412 received by the pervasive search engine 414.

Although not shown here, but in later figures, the remote device 418 can comprise a remote indexer component and a remote serve component as part of a remote compute node. The remote indexer component generates the shared content index 422 and the remote serve component serves the shared content index 422 to a remote search engine (not shown, but similar to pervasive search engine 414) of the remote device 418 that processes the query 412. The remote serve component receives zero, some, or all of shared personal content of the shared content 424 as the shared content results 426 from the remote search engine and returns the shared content results 426 to the serve component 416 of the device 404.

The indexer component 402 and serve component 416 are part of a compute node that processes the query 412 on the device 404. The compute node forwards the query 412 to other compute nodes of other devices (e.g., the remote device 418) and, aggregates and ranks retrieved personal content results (e.g., shared personal content results 426) from the other compute nodes with the personal content results 428 of the device 404.

The serve component 416 serves the index 408 for processing of the query 412 on the device 404, and zero, some, or all personal content of the personal content 410 of the content owner 406 (as the content results 428) and zero, some, or all shared personal content of the personal content 424 (as the shared content results 426) of the remote device 418 are presented, optionally, with web search results 430 on the device 404. The web results are optional in that the query 412 can be limited to devices on an enterprise or intranet, in which case, no web results are desired.

The content owner 406 can be a human user or a non-human user such as a traffic camera and the shared content owner 420 can be a human user or non-human user such as a weather camera, etc.

The indexer component 402 and serve component 416 are shown internal to the device 404; however, in one implementation, these components can be applications that run external to the device 404, as previously illustrated in FIG. 3 for example.

Although not shown, the disclosed architecture can provide a privacy component that enables the user to opt in or out of exposing personal content, and other information. The privacy component enables the authorized and secure handling of user information.

In a purely home or other private network implementation, for example, it can be the case that one of the private network devices, a designated private device (also referred to as a "local network device", denoted as "local" to distinguish from "other" network devices), serves as the designated search engine and designated compute node for one or more of the other private network devices (also referred to as "other network devices"). The designated private network device is given access to the personal content of the other private network devices and the designated compute node generates a private network index for all accessible shared personal content of the other private network devices, the private content of the other private network devices as well as the private content of the designated private device, since these devices are all managed and controlled by the same owner of the private network. Thus, a query presented to any of the private network devices is then routed to the designated private device and processed against the private network index to return private content and/or shared personal content of the designated private device and other private network devices.

Figure 5:
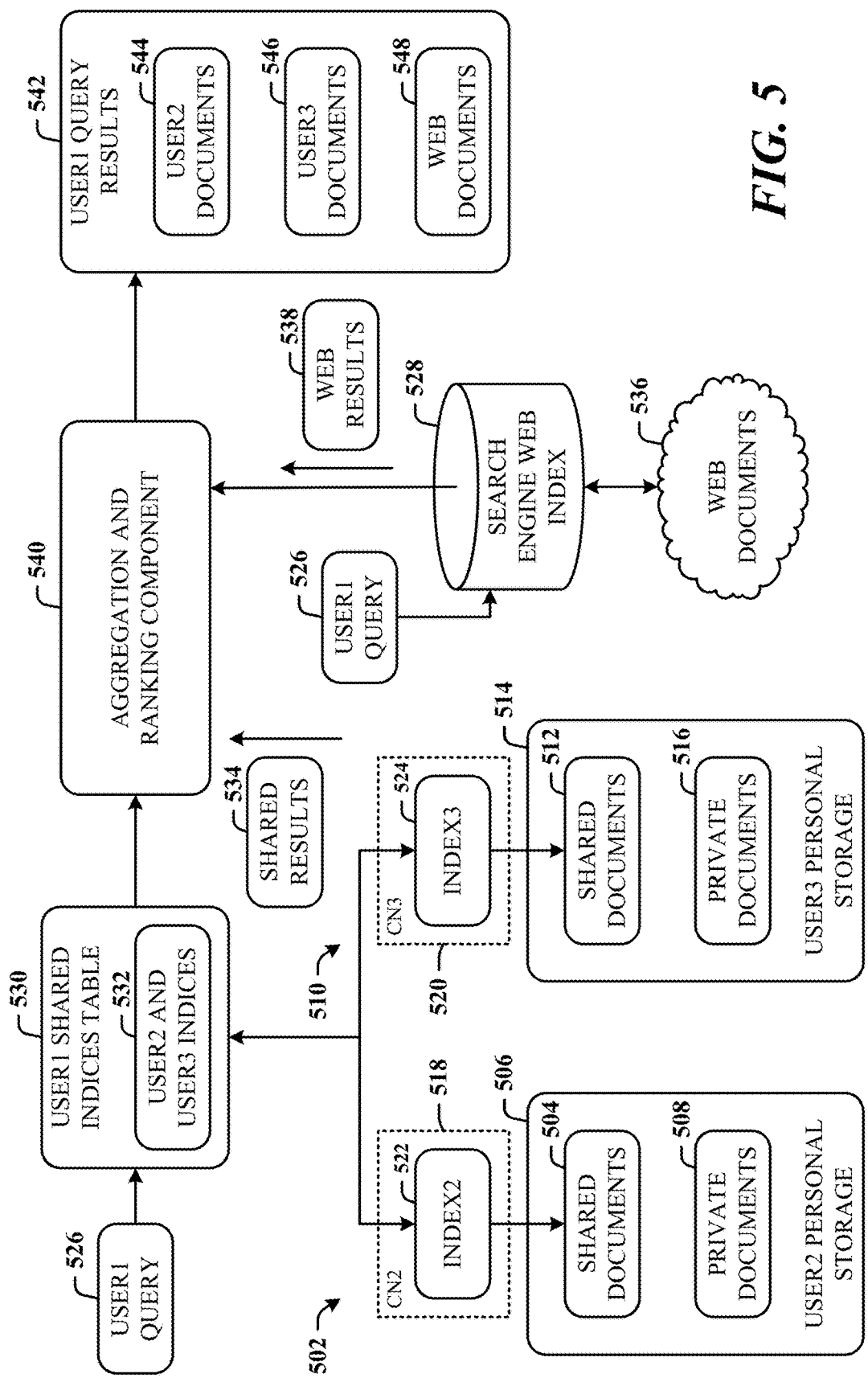
FIG. 5 illustrates a system that serves web and shared documents as search results.

FIG. 5 illustrates a system 500 that serves web and shared documents as search results. In this example system 500, two user devices are shown that permit access by a first user (User1) to their shared personal documents. (Note that this example only shows the search against the shared personal documents of two other users (a second user (User2) and a third user (User3), and not the first user actually making the query; however, during typical operation, the search can also be processed against the private and shared documents of the first user, should the first user enable that to be performed.)

For example, the second user (User2) 502 permits access to second user shared personal documents 504 of a second user personal storage 506, which also stores access-prohibited private documents 508 (only accessible by the second user). Similarly, the third user (User3) 510 permits access to third user shared personal documents 512 of a third user personal storage 514, which also stores access-prohibited private documents 516 (only accessible by the third user).

The devices of each user (502 and 510) comprise a compute node (CNx) for creating a personal content index and serving the personal content index to a web-based search engine. For example, the device of the second user 502 includes a second compute node (CN2) 518, and the device of the third user 510 comprises a third compute node (CN3) 520.

The indices produced by the compute nodes (518 and 520) can be handled in several different ways. For example, in order to provide optimum performance, the indices are processed locally on the devices by device pervasive search engines and the results are passed directly into the browser application to be presented with web results, rather than being passed to the web-based search engine for presentation back to the local device with the web results.

Alternatively, one or more of the indices can be uploaded to a dedicated pervasive network search engine (e.g., network search engine 234 of FIG. 2) (a search engine other than the web-based search engine and the device pervasive search engines) for processing of personal and shared personal document identification and retrieval based on a received User1 query 526. The query 526 is shown as being applied not only to a search engine web index 528, but also to a shared indices table 530. The shared indices table 530 stores the index information for the indexes (522 and 524) of the second and third users (502 and 510).

In yet another implementation, the indices (522 and 524) can be uploaded to the web-based search engine for query processing and return of the web results and shared personal results to the first user. In this implementation, the web search engine analyzes the indices for permissions, tags, and identification information that indicate the specific personal content to be returned and presented in the first user browser.

In this example, the web search engine can then request the shared result content from the devices (502 and 510), and rank the shared result content to select the top shared result content to present in the browser of the first user. In still another alternative to this example, the web search engine can send information to the local devices of the user (502 and 510) that specifies the content to be extracted for presentation, based on the web search engine processing of the indices (522 and 524).

These are just several examples of the protocols that can be employed to handle query processing when using multiple search engines (pervasive and web-based) and public/private and shared personal content.

In this example, the pervasive search engine of the device (not shown) of the first user receives the query 526 and processes the query 526 in view of index information stored in the shared indices table 530 (which identifies the shared indexes (522 and 524). The query 526 is processed by the device of the first user by at least forwarding the query 526 for processing on each of the devices of the second and third users (502 and 510). The pervasive search engines (not shown) of the shared devices of the second and third users (502 and 510) each process the query 526, and the shared results 534 (shown as a single block of results, but actually comprise separate sets of results from the devices of each of the second and third users (502 and 510)) are returned.

Similarly, the web search engine (not shown) processes the query 526 using the search engine web index 528 and web documents 536 to return web results 538. The shared personal results 534 and web results 538 are aggregated and ranked using an aggregation and ranking component 540, and output to the first user as query results 542. The aggregation and ranking component 540 can be associated with the web search engine system such that the first user device sends the shared results to the web search engine for aggregation and ranking with the web results 538, and ultimate presentation.

The query results 542 presented to the querying user comprise zero, one, or more shared personal documents 544 from the second user shared personal documents 504, zero, one, or more shared personal documents 546 from the third user shared personal documents 512, and/or zero, one, or more web documents 548 from the web documents 536.

The ranking of pervasive search results involves determining the significance (or relevance) of the retrieved piece of shared and/or stored content on personal devices for a given user query depending on user preferences and the query signal/relevance. For example, consider a user query, "summer garden 2013". If the system computes or has computed that the user is an avid gardener and photographer, and has a huge collection of garden photographs taken in summer 2013, those retrieved photographs for the query can be ranked higher in comparison to text documents that have "summer", "garden", and "2013" mentioned therein, or even web results for "summer garden 2013", much of which will be irrelevant to the user due to the generic and trite (albeit personal) nature of the query. Accordingly, the ranking capability of the aggregation and ranking component 540 can rank shared personal content results in view of the associated significance of the shared personal content results to the user and the user query.

The aggregation and ranking process can be performed separately on the shared personal results 534 and on the web results 538, such that each set of results is ranked independently of the other. In this case, the shared results can be presented as a single annotated and ranked grouping in the browser (or other application) or separate annotated ranked sets of each of the users (502 and 510) shared results groups, as indicated herein below.

In an alternative implementation, all of the shared results 534 and web results 538 are ranked together, and then separated in the user interface (UI) for user identification as to which results are the ranked shared personal results, and which are the ranked web results.

Still further, alternatively, the entire set of shared and web results can be presented as a single set of results with the shared results annotated with some kind of identifier that identifies the result as a shared results of a specific pervasive network user. Additionally, as indicated herein, the aggregation and ranking can also include the private documents and/or shared personal documents of the first user (the querying user), as described herein below.

The pervasive search architecture enables powerful search scenarios involving personal events. For example, the user can query for personal event-related content on personal devices using queries such as "my Hawaii vacation 2012", "New Year's 2013", "Father's day", which are far more relevant for personal content available on personal storage devices than online content publically available on the web.

In this example system 500, the web search engine (not shown, but associated with the web index 528 and web results 538) can comprise hardware and applications that facilitate storage and processing of query 526, access and retrieval of shared personal documents from the second and third devices of the corresponding users (502 and 510), the shared results 534, the search engine web index 528 and web results 538, the aggregation and ranking component 540 for aggregating and ranking the shared results 534 and web results 538, and the presentation of the query results 542 on the first user device.

Figure 6:
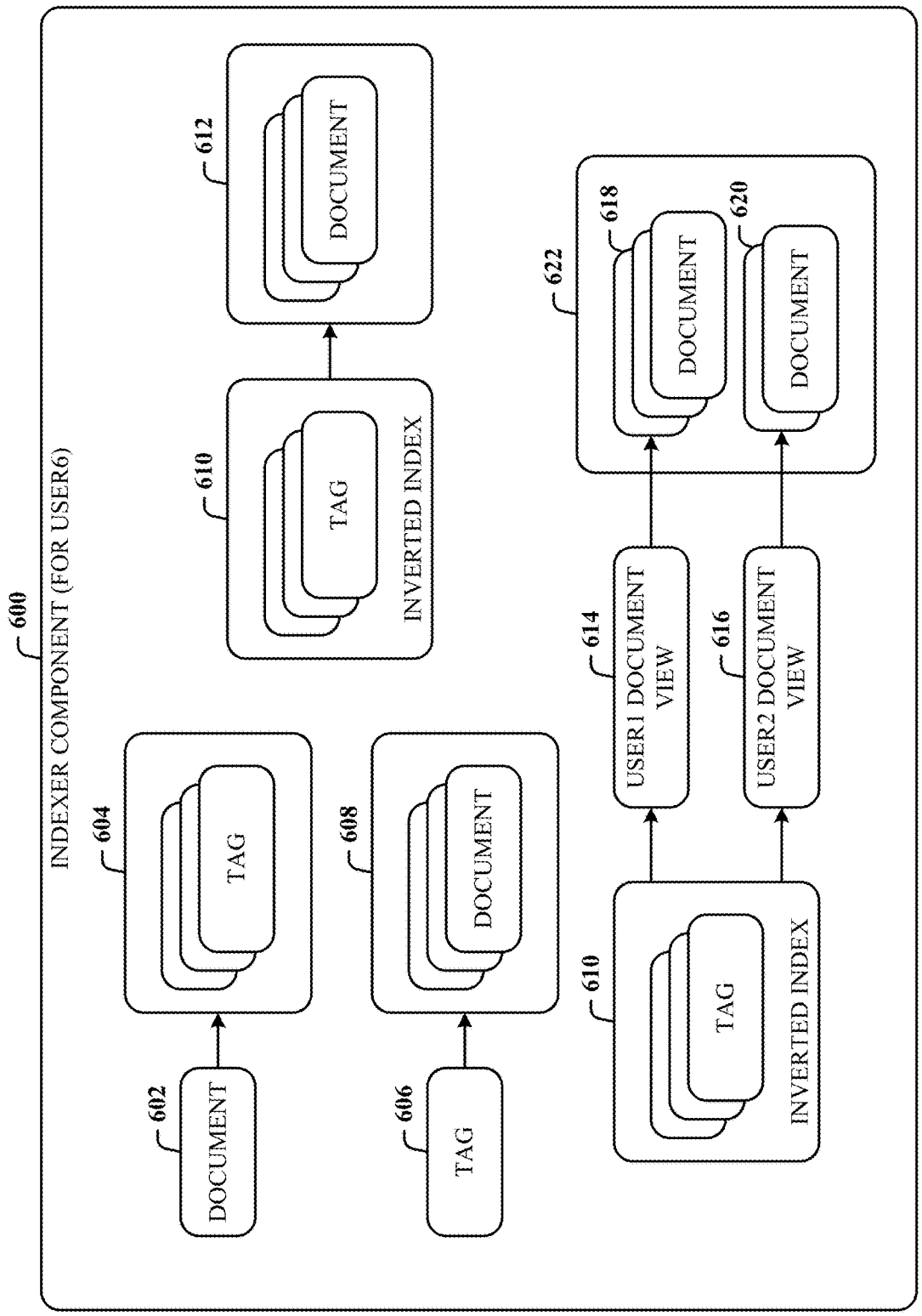
FIG. 6 illustrates an indexer component of a pervasive network compute node that generates an index of shared documents of a user device.

FIG. 6 illustrates an indexer component 600 (similar to indexer component 102) of a pervasive network compute node that generates an index of shared documents of a user device. In this particular example, the indexer component 600 (e.g., of a third user of three users) takes document tags and generates an inverted index for the documents. It is to be understood, however, that this is only one type of indexing technology that can be employed. For example, alternatively, other indexing technologies such as suffix tree, n-gram index, document-term index, and so on, can be employed. The document views ascertain what documents in the inverted indexes are accessible for a given user. The document or content owner decides the users who can query and view the documents by way of permissions (e.g., account, folder, file, etc.).

Each document (a document 602) can be processed for tags 604 (e.g., words) that relate to the given document. Moreover, multiple different documents may have the same tags. Accordingly, a single tag, tag 606, may be related to many different documents 608 having the same tag. An inverted index 610 is then created that maps the tags (e.g., tag 606) to one or more of the documents 612 in the shared documents of given user devices; a first user device (the querying user) and a second user device (a sharing user).

Once generated, the inverted index 610 is then used (e.g., by the local search engine) for processing a query submitted by the first user to return document views of personal documents, for example, a first user document view 614 of documents 616 on the third user device that are accessible by the first user and a second user document view 618 of documents 620 on the third user device that are accessible by the second user. As previously indicated, the document views ascertain what documents in the inverted indexes are accessible for a given user. Thus, the querying user is presented with the results 622, which can include not only the pervasive network document results, but also the web document results (not shown).

Figure 7:
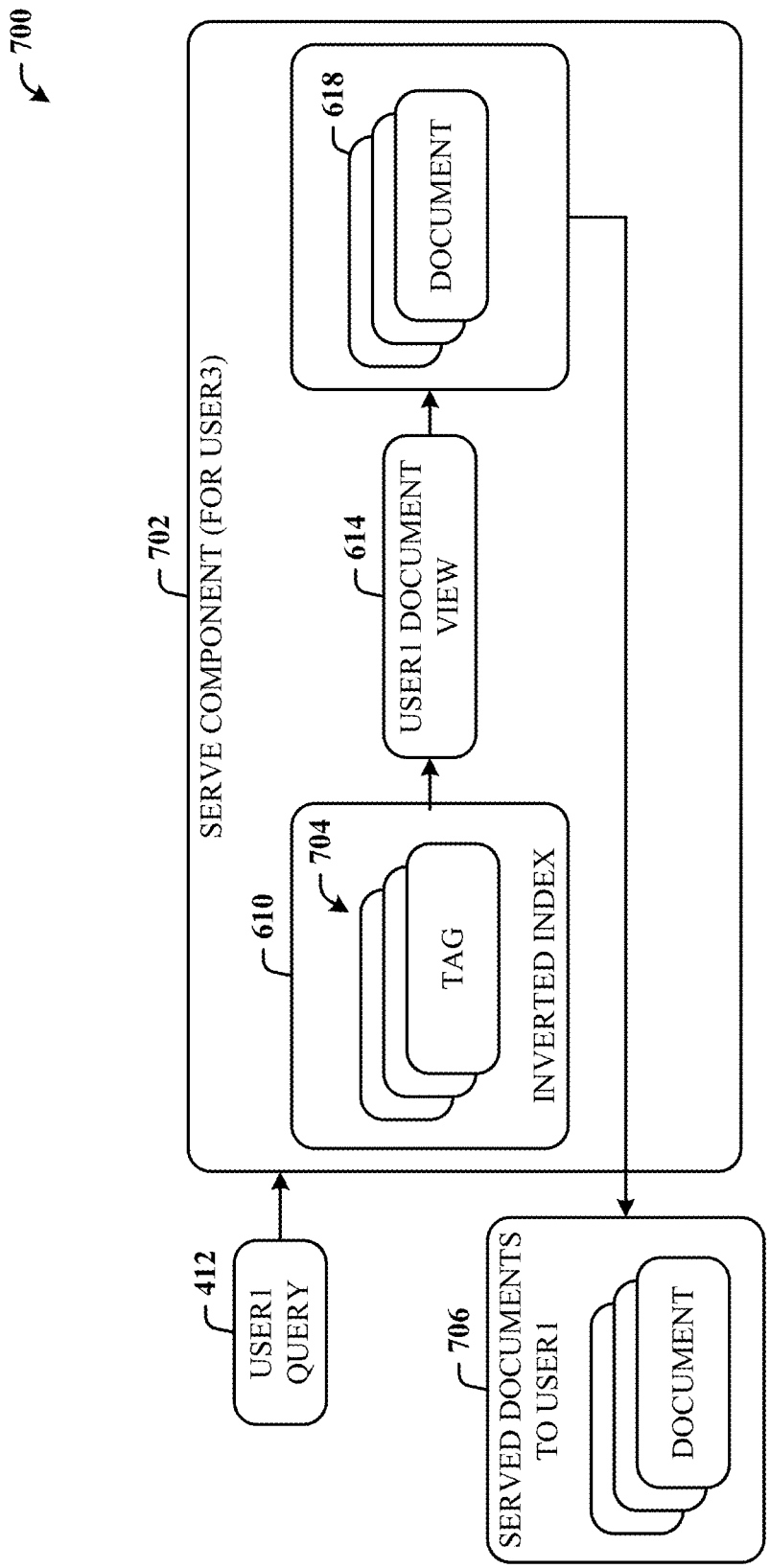
FIG. 7 illustrates a serve system of a compute node that serves the index and relevant documents for an incoming query.

FIG. 7 illustrates a serve system 700 of a compute node that serves the index and returned relevant personal documents based on the query 412. A serve component 702 (similar to the serve component 118) for the third user (User3) identifies the documents accessible to the first user issuing the query 412. The serve system 700 utilizes the serve component 702 to interface to the pervasive search engine (of a given device) such that the user query 412 of the first user (User1), as processed against the inverted index 610 (of User3) of tags 704 that match the query 412, returns only those documents identified by the first user document view 614, as represented by the served documents 706 to the first user.

Figure 8:
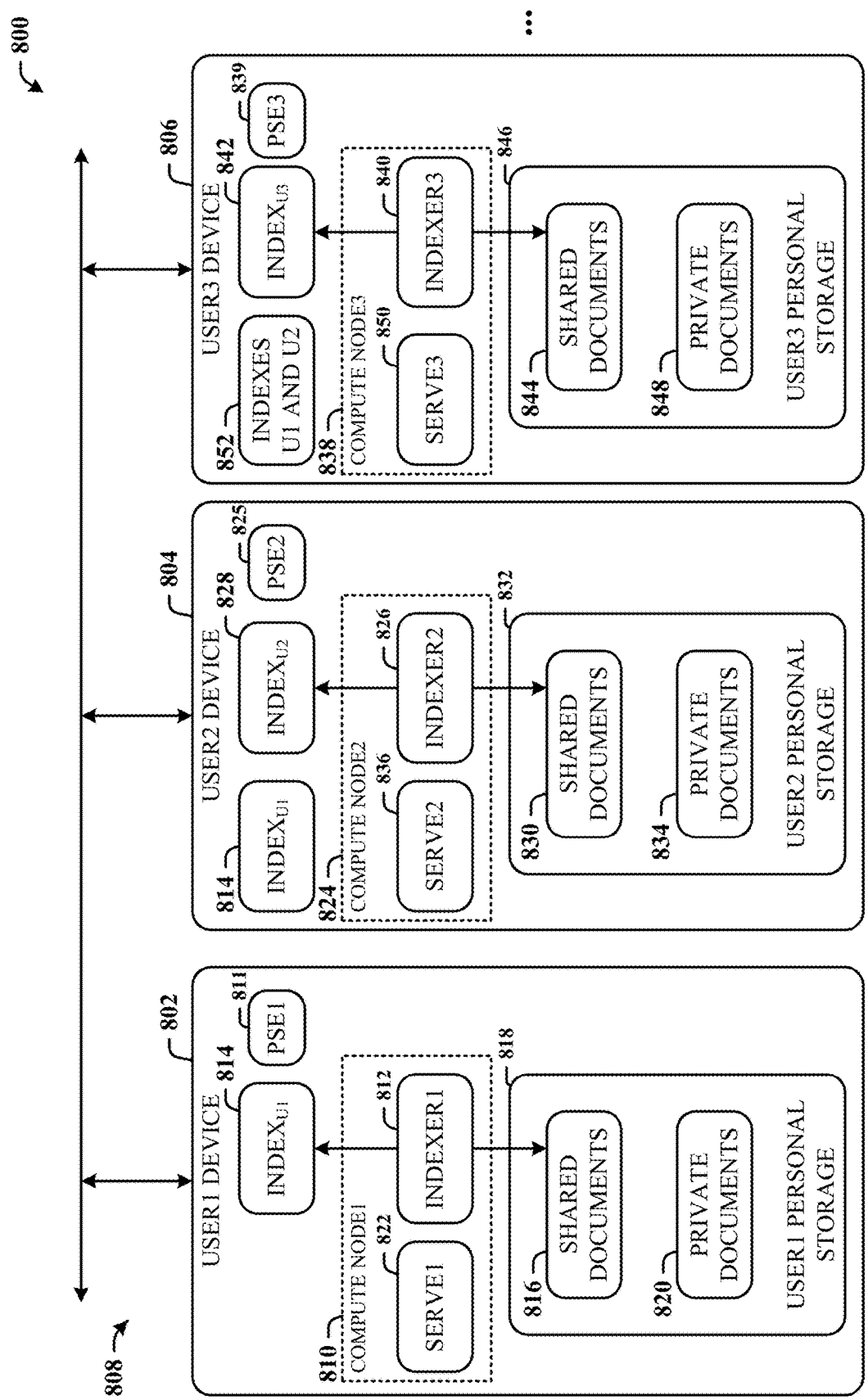
FIG. 8 illustrates a distributed indexing system for compute nodes.

FIG. 8 illustrates a distributed indexing system 800 for compute nodes. Depicted are three user devices (a first user device 802, a second user device 804, and a third user device 806) of many different possible devices 808 such as personal user devices (e.g., tablet computer, digital cameras, video cameras, audio devices, smartphone, portable computer, etc.) and non-personal user devices (e.g., autonomous sensor systems, traffic camera, street camera, weather sensors, etc.) that can communicate using any one or more technologies such as wired (e.g., Ethernet™), wireless (e.g., Ethernet™), and short range wireless (e.g., Bluetooth™), for example.

The first user device 802 comprises a first compute node 810 for creating a personal index and serving the index to a pervasive search engine 811 (also denoted PSE1). The first compute node 810 comprises a first indexer component 812 that creates a first personal index 814 of shared documents 816 of a first user personal storage 818, which also includes private documents 820 that are restricted from unauthorized external access by other users and/or systems. The first compute node 810 also comprises a first index serve component 822 that serves the first personal index 814 to the pervasive search engine 811.

Similarly, the second user device 804 comprises a second compute node 824 for creating a personal index and serving the index to a pervasive search engine 825 (also denoted PSE2). The second compute node 824 comprises a second indexer component 826 that creates a second personal index 828 of shared documents 830 of a second user personal storage 832, which also includes private documents 834 that are restricted from unauthorized external access by other users and/or systems. The second compute node 824 also comprises a second index serve component 836 that serves the second personal index 828 to the pervasive search engine 825.

The third user device 806 comprises a third compute node 838 for creating a personal index and serving the index to a pervasive search engine 839 (also denoted PSE3). The third compute node 838 comprises a third indexer component 840 that creates a third personal index 842 of shared documents 844 of a third user personal storage 846, which also includes private documents 848 that are restricted from unauthorized external access by other users and/or systems. The third compute node 838 also comprises a third index serve component 850 that serves the third personal index 842 to the pervasive search engine 839.

In each device case, when the pervasive search engine processes the query generated by the first user (or possibly received by the first user device), for example, and the first user is permitted access to the shared documents (830 and 844) of the second and third devices (804 and 806), the second and third personal indexes (828 and 842) stored locally are processed to retrieve the related shared personal documents (of the shared documents 830 and 844) shared from the corresponding second and third devices (804 and 806), and present the related shared personal document results to the user of the first user device 802 (and possibly along with web-based results from the web search engine).

The personal indexes (814, 828, and 842) can be distributed across other user devices. For example, the first personal index 814 can be cloned on one or more other user devices, such as on the second user device 804. Similarly, the first personal index 814 and second personal index 828 can each be cloned as indexes 852 on one or more other user devices, such as on the third user device 806.

Thus, it is to be appreciated that distributing indexes across one or more other devices provides higher availability of the personal documents for search should indexing and/or application failure occur on a device. The index serve component of each device can be configured to pass the cloned index(es) to other devices and/or to the search engine, as desired.

Figure 9:
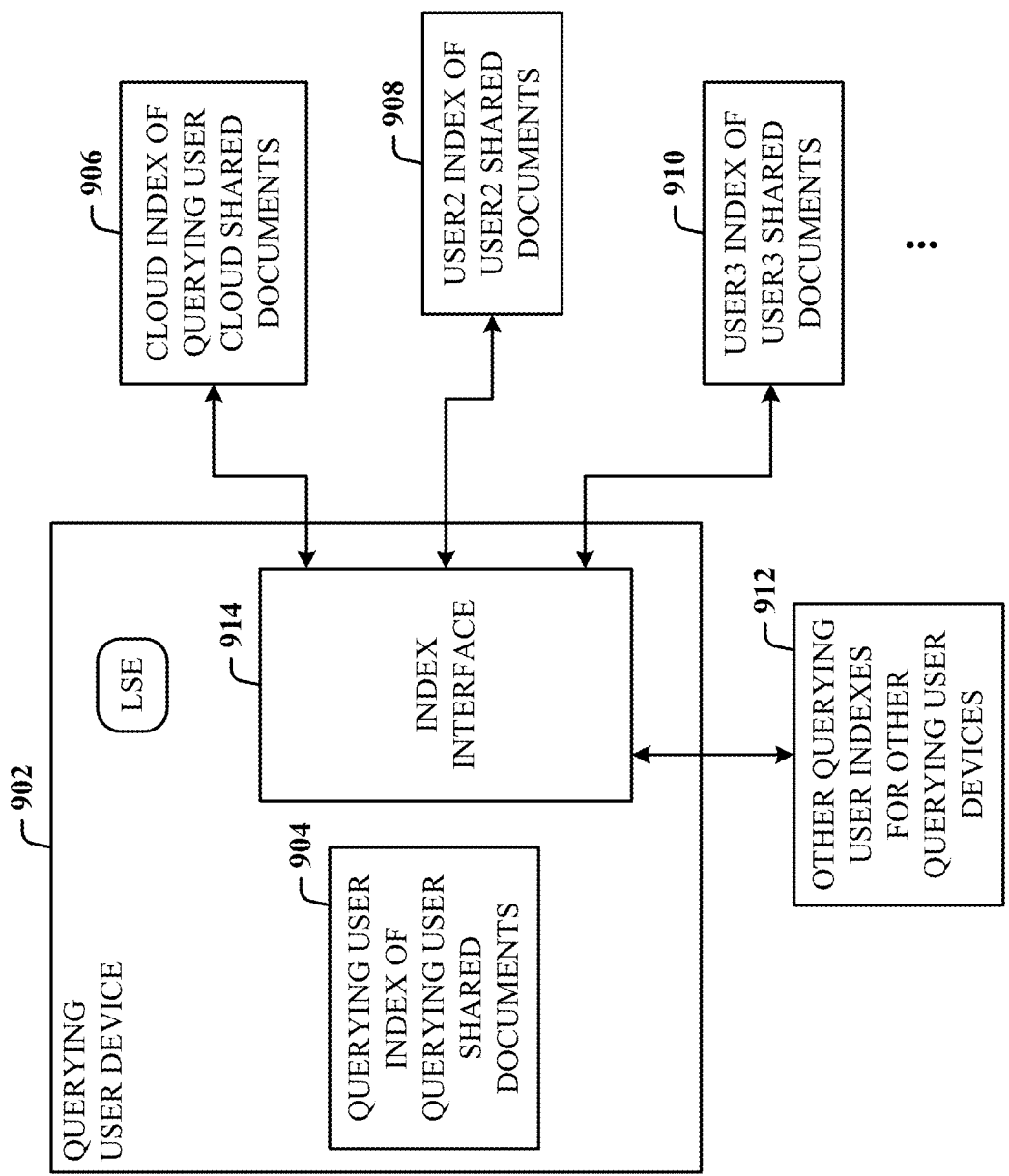
FIG. 9 illustrates an index interface that facilitates updating and accessing indexes for various content locations.

FIG. 9 illustrates an index interface system 900 that facilitates updating and accessing indexes for various content locations. For example, an index 904 of personal shared documents for the querying user can exist on the querying user device 902, a cloud index 906 for personal shared documents for the querying user stored in the cloud (e.g., a personal network location, a personal network location such as a social network, etc.), an index 908 for personal shared documents of a second pervasive network user (User2), an index 910 for personal shared documents of a third pervasive network user (User3), as well as for other querying user indexes 912 of other querying user devices, and so on. The index 904 stored on the user device 902 can be a single index that identifies the other indexes of other personal devices of the querying user. Moreover, the index 904 can be a single index created by merging the individual indexes of the other user personal devices. The index interface 914 then facilitates the update of the index 904 according to updates made individually by the other user personal devices to their individual index. Thus, when the index 904 is processed for a query on the user device 902, the results can be obtained directly from (pulled) each of the other user personal devices without running the query against the indexes (using pervasive search engines) of the other user personal devices.

Thus, an index interface 914 provides the link (associated with the querying user ID of the machine/device being used) to all other external and personal indexes of the querying user, as well as sharing users. In other words, the index interface 914 tracks the other nodes (devices, machines) associated with the user and accessible by the user as owned by the user and as authorized to access by shared content owners. Thus, the index interface 914 of the querying user device 902 provides the capability to access and update the various external indexes as well as receive updates from the various external indexes to the index 904.

The querying user can access any querying user index of any querying user device, such as on a home network or office computers/devices of the querying user as content owner of all these devices, as well as the shared index from any device of the querying user. Moreover, the index interface 914 enables the querying user to access the index of private (not shared) content of the device.

Figure 10:
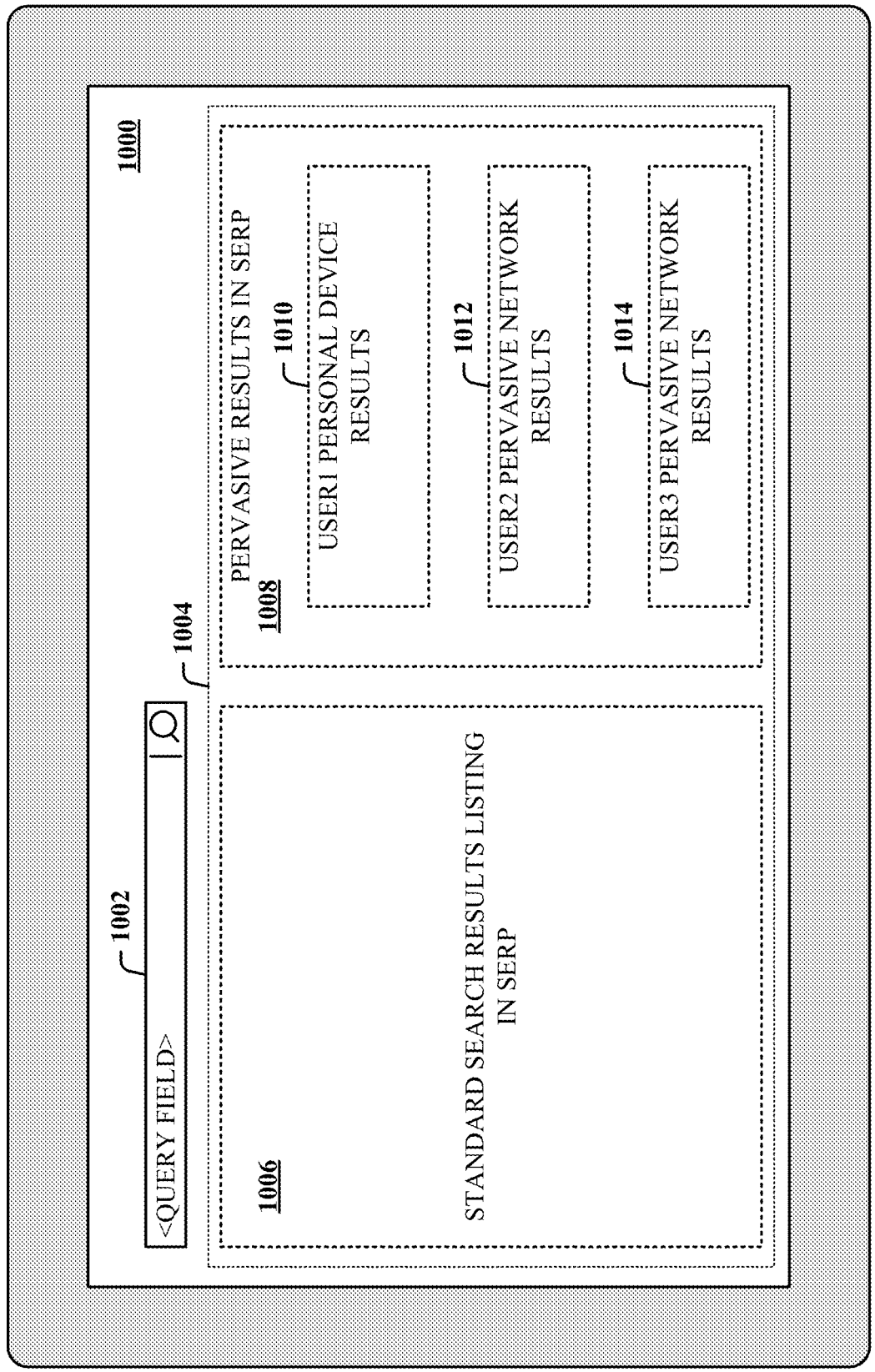
FIG. 10 illustrates an exemplary user interface for pervasive search that enables personal data to be searched and returned for a query.

FIG. 10 illustrates an exemplary user interface (UI) 1000 for pervasive search that enables personal data to be searched and returned for a query. In this particular example, the UI 1000 (e.g., of a tablet) comprises a query box 1002 in which a first user enters a query (e.g., query 112, query 226, etc.) for processing. The web results and personalized content results are returned for presentation to the first user in a search engine results page (SERP) 1004. In this presentation, the left side of the SERP 1004 shows the ranked web results 1006, and the right side of the SERP 1004 shows the pervasive results 1008 of personalized content. The personalized content of the pervasive results 1008 can include user personal device results 1010 (e.g., ranked left-to-right) of one or more user devices, second user pervasive network results 1012 (e.g., ranked left-to-right) from a second user of the pervasive network of shared personal content, and third user pervasive network results 1014 (e.g., ranked left-to-right) from a third user of the pervasive network of shared personal content.

The second and third users have allowed access to some or all of their personal content via the private indexes of the second and third users created and stored for use based on a query of the first user.

Figure 11:
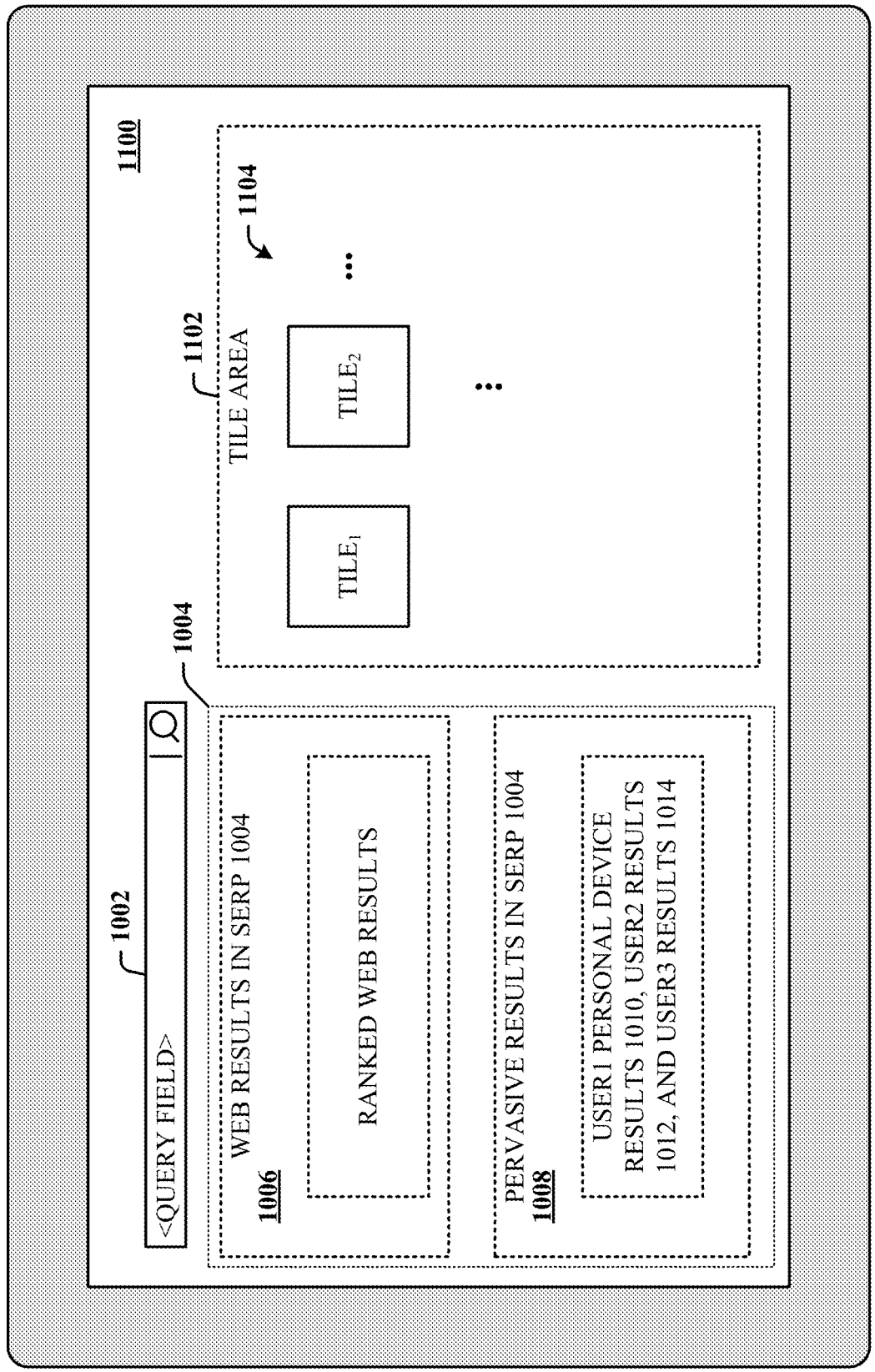
FIG. 11 illustrates an exemplary user interface for pervasive search that enables personal data to be searched and returned for a query.

FIG. 11 illustrates an exemplary user interface 1100 for pervasive search that enables personal data to be searched and returned for a query. In this particular example, the UI 1100 (e.g., of a tablet) comprises the query box 1002 in which a first user enters a query for processing. The web results and personalized content results are returned for presentation to the first user in the SERP 1004. In this presentation, the SERP 1004 is presented on the left side of the UI 1100 and shows the ranked web results 1006 in the SERP 1004 and the pervasive results 1008 of personalized content. As before, the pervasive results can include user personal device results 1010 of personal content of one or more user devices, second user results 1012 of personal content from a second user of the pervasive network of shared personal content, and third user results 1014 of personal content from a third user of the pervasive network of shared personal content, as well as content from other sharing users of the pervasive network.

The second and third users have authorized (enabled permission) by first user to access to some or all of their device results, and thus, to allow access their designated personal content (e.g., local and/or cloud) via the private indexes of the second and third users created and stored for search by the first user. The right side of the UI 1100 can show a tile area 1102 of desktop tiles 1104 as enabled for user interaction with device programs and/or data.

Figure 12:
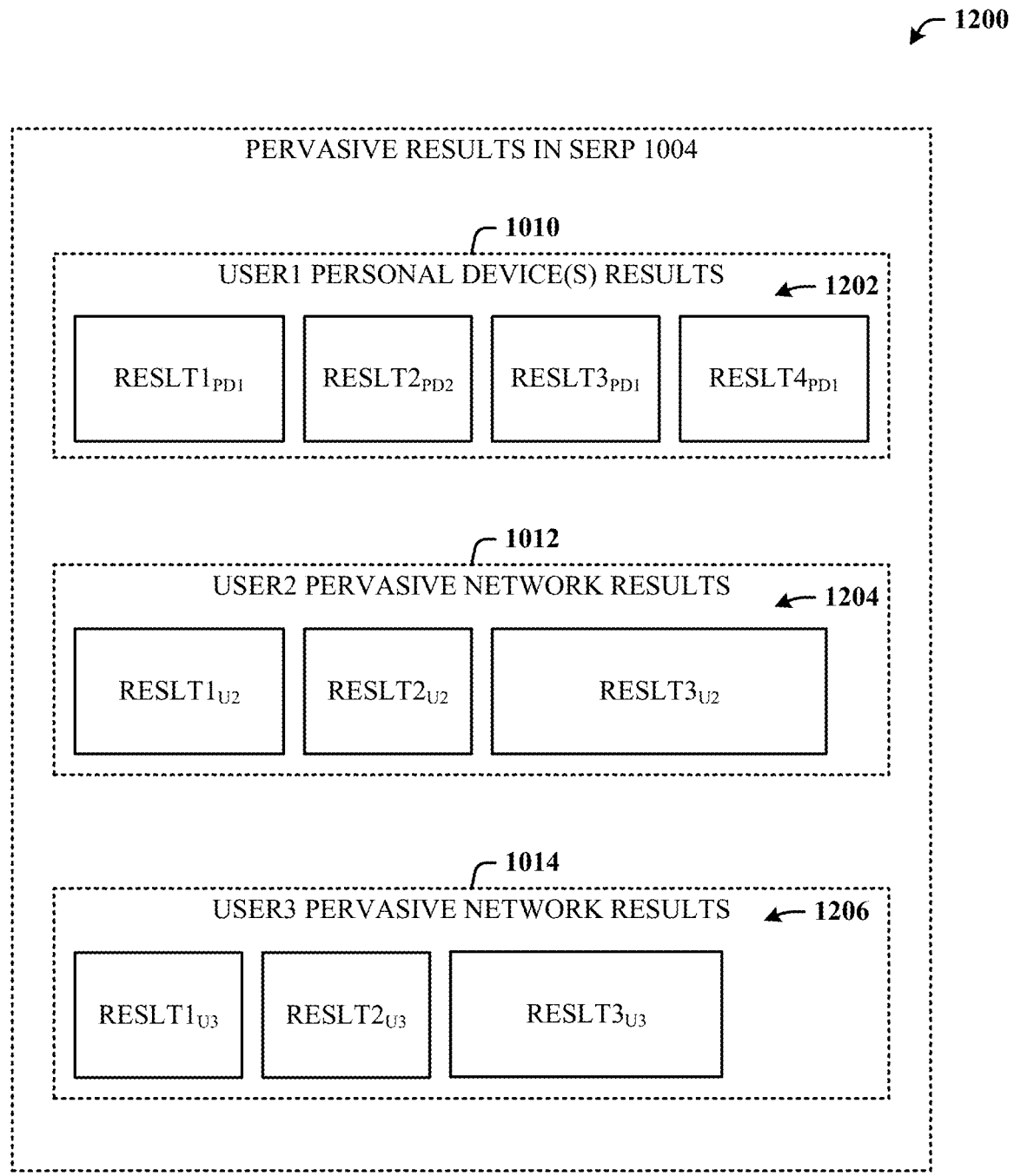
FIG. 12 illustrates a more detailed example of the pervasive results presented in the SERP of the user interface.

FIG. 12 illustrates a more detailed example of the pervasive results 1200 presented in the SERP 1004 of the user interface. Personal documents of the first user and of the other users include but are not limited to, photographs, images, videos, text documents such as receipts and word documents, spreadsheets, audio files, etc. These documents may reside on personal devices that index the local documents and personal documents stored in a network (e.g., the "cloud") account or location.

In this particular example, the pervasive results 1200 are returned for presentation to the first user in the SERP 1004. In this presentation, the first user ranked results 1202 of personalized content of the results 1010 for the first user (the querying user), as obtained from one or more devices of the first user and/or a cloud location, can include four instances of ranked results (e.g., ranked left-to-right as highest to lowest of the four instances).

For example, if the query is "garden", the user1 index (stored at the search engine) can be searched for documents indexed by the term "garden" and then returned as part of the pervasive result in the SERP 1004. In other words, a first result ($RESLT1_{PD1}$) of the first user (User1) ranked results 1202 can be a document image of a garden with tags of "veggie, summer, raised bed, august, 2012". (Note, this result can be from a first device of the first user, as indicated by "PD1" (Personal Device-1).) Similarly, a second result ($RESLT2_{PD2}$) of the first user (User1) ranked results 1202 can be a document image of a bowl of cherries associated with tags of "cherries, harvest, October, 2011". (Note, this result can be from a second device of the first user, as indicated by "PD2" (Personal Device-2).) A third result ($RESLT3_{PD1}$) of the first user (User1) ranked results 1202 can be a document image of a receipt with tags of "nursery, receipt, finance, 2013", and a fourth result ($RESLT4_{PD1}$) of the first user (User1) ranked results 1202 can be a document icon of a spreadsheet associated with tags of "sowing, timeline, nursery, excel".

Similar results can then be returned from the sharing users (User2 and User3) of the pervasive network. For example, a first result ($RESLT1_{U2}$) of the second user (User2) ranked results 1204 can be a document image of raspberries with associated tags of "raspberries, fall, 2011", a second result ($RESLT2_{U2}$) of the second user (User2) ranked results 1204 can be another document image of tomatoes with associated tags of "cherry tomato, summer, 2013", and so on, for other personal document content. The third user ranked results 1206 returned for the third user (User3) can include a first result ($RESLT1_{U3}$) having a document image of tomatoes with associated tags of "roma tomato, fall, 2012", a second result ($RESLT2_{U3}$) as a word processing document icon with associated tags of "growing romas, HowTo, doc", and so on, for other personal document content.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 13:
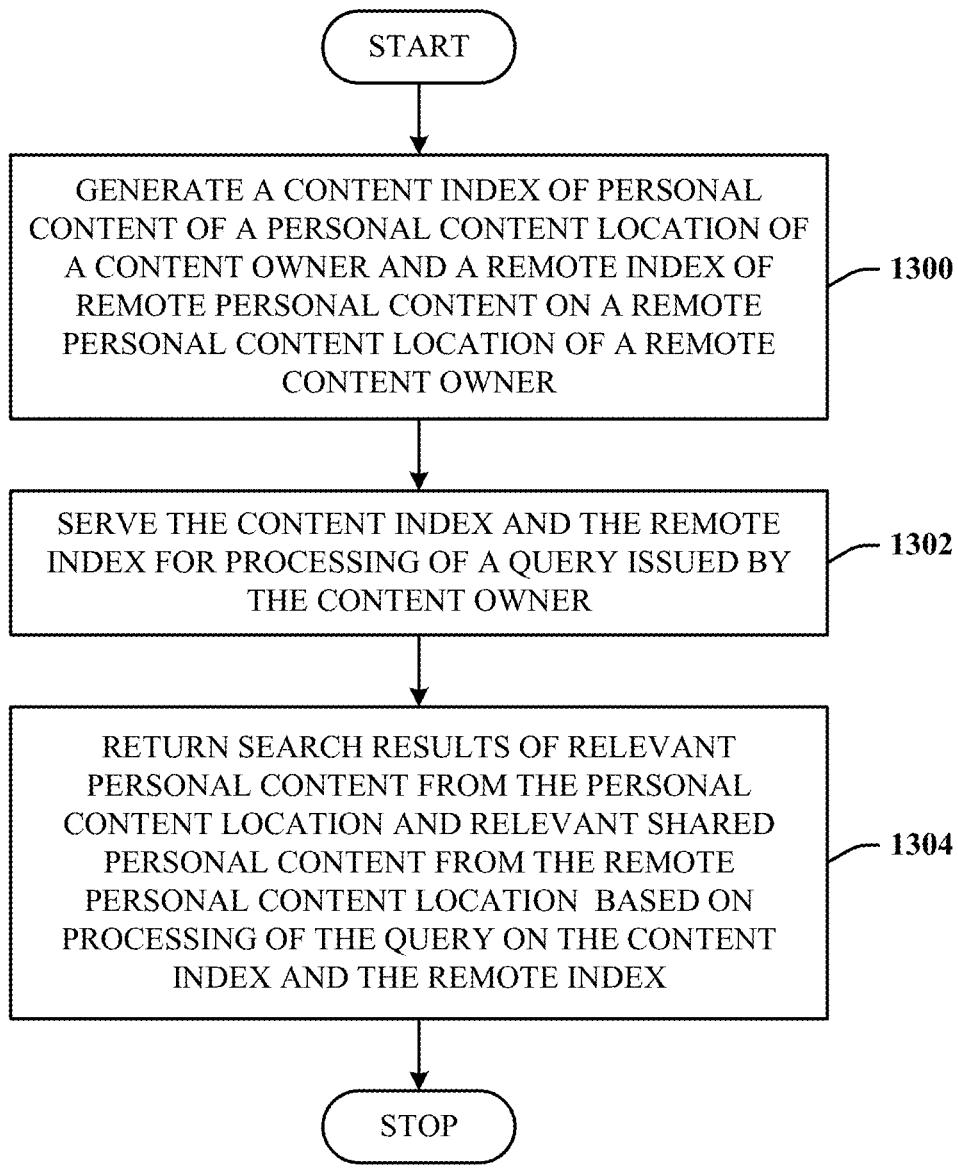
FIG. 13 illustrates a method in accordance with the disclosed architecture.

FIG. 13 illustrates a method in accordance with the disclosed architecture. At 1300, a content index of personal content of a personal content location of a content owner is generated and a remote index of remote personal content on a remote personal content location of a remote content owner is generated. At 1302, the content index and the remote index are served for processing of a query issued by the content owner. At 1304, search results of relevant personal content are returned from the personal content location and relevant shared personal content from the remote personal content location are returned based on processing of the query on the content index and the remote index.

The method can further comprise processing the query against the content index and the remote index, and against a web index, and returning web results along with the relevant personal content and the relevant shared personal content for presentation to the content owner.

The method can further comprise processing the query at the personal content location of the content owner as against the content index, and processing the query on the remote personal content location of the remote content owner as against the remote index.

The method can further comprise merging the content index and the remote content index to create a merged index, and storing the merged index in a network storage location for access and processing by a search engine to return relevant personal content and relevant shared personal content as search results.

The method can further comprise forwarding the query from the remote personal content location to another remote personal content location, processing the query against another remote index of the another remote personal content location, and returning relevant personal content from the another remote personal content location to the remote personal content location. The method can further comprise cloning the content index and remote index at one or more other personal content locations.

Figure 14:
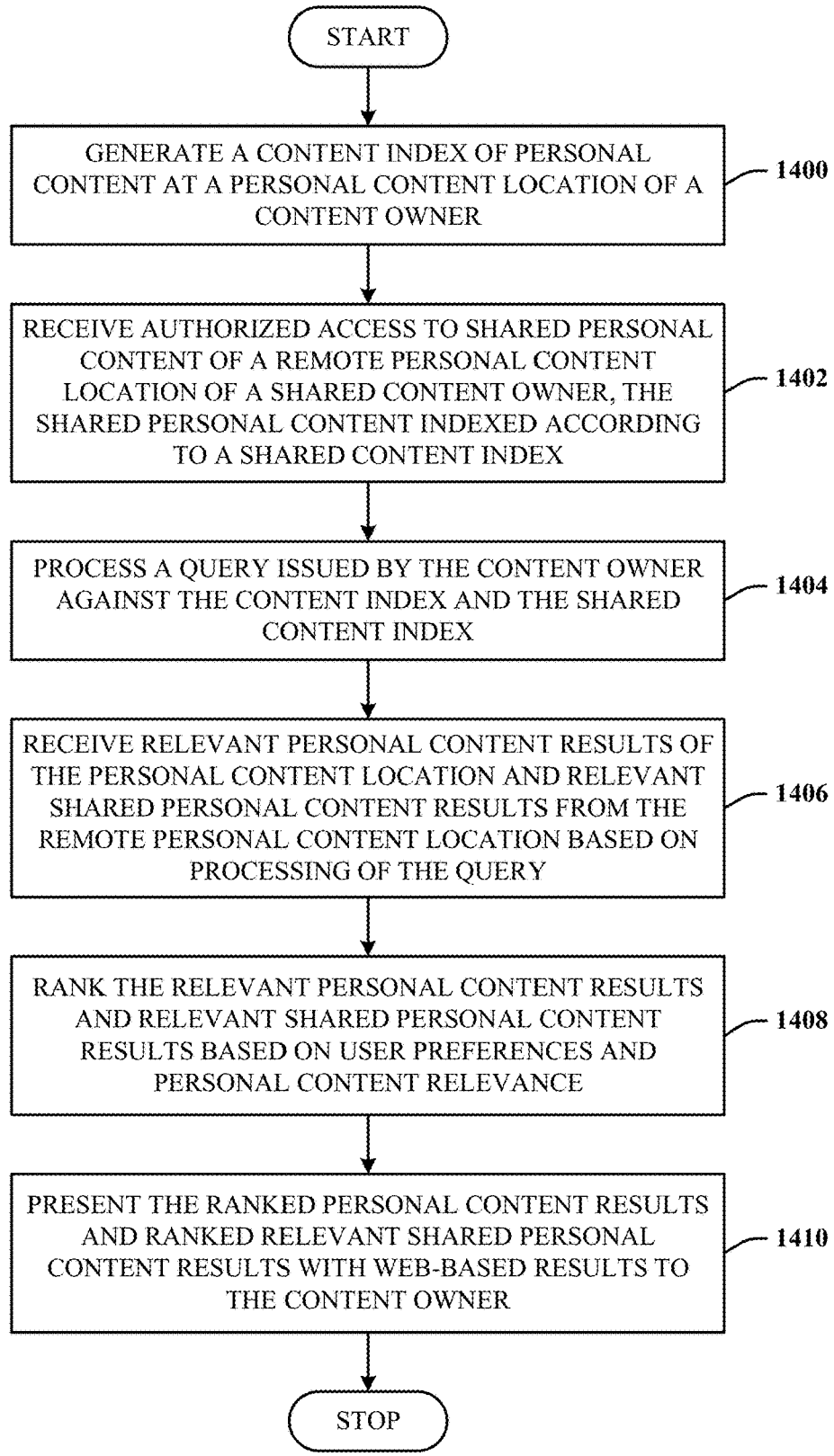
FIG. 14 illustrates an alternative method in accordance with the disclosed architecture.

FIG. 14 illustrates an alternative method in accordance with the disclosed architecture. The method can be embodied on a computer-readable storage medium comprising computer-executable instructions that when executed by a microprocessor, cause the microprocessor to perform one or more of the following acts. At 1400, a content index of personal content is generated at a personal content location of a content owner. At 1402, authorized access to shared personal content of a remote personal content location of a shared content owner is received. The shared personal content is indexed according to a shared content index. At 1404, a query issued by the content owner is processed against the content index and the shared content index. At 1406, relevant personal content results of the personal content location and relevant shared personal content results from the remote personal content location are received based on processing of the query. At 1408, the relevant personal content results and relevant shared personal content results are ranked based on user preferences and personal content relevance. At 1410, the ranked personal content results and ranked relevant shared personal content results are presented with web-based results to the content owner.

The method can further comprise receiving the relevant shared personal content results from the remote personal content location based on at least one of proximity of the personal content location to the remote personal content location, quality measure of the relevant shared personal content of the remote personal content location, relevance of the shared personal content of the remote personal content location or confidence measure of the shared content owner.

The method can further comprise indexing realtime data of the remote personal content location and serving the realtime data index to the query. The method can further comprise distributing and caching the content index and the shared personal content index among multiple personal content locations.

The method can further comprise sending the query from the personal content location directly to the remote personal content location and other accessible remote personal content locations, processing the query at each of the remote personal content location and the other accessible remote personal content locations, and receiving back at the personal content location relevant content results from any one or more of the remote personal content location and the other accessible remote personal content locations.

The following alternative methods are presented in terms of devices rather than personal content locations.

Figure 15:
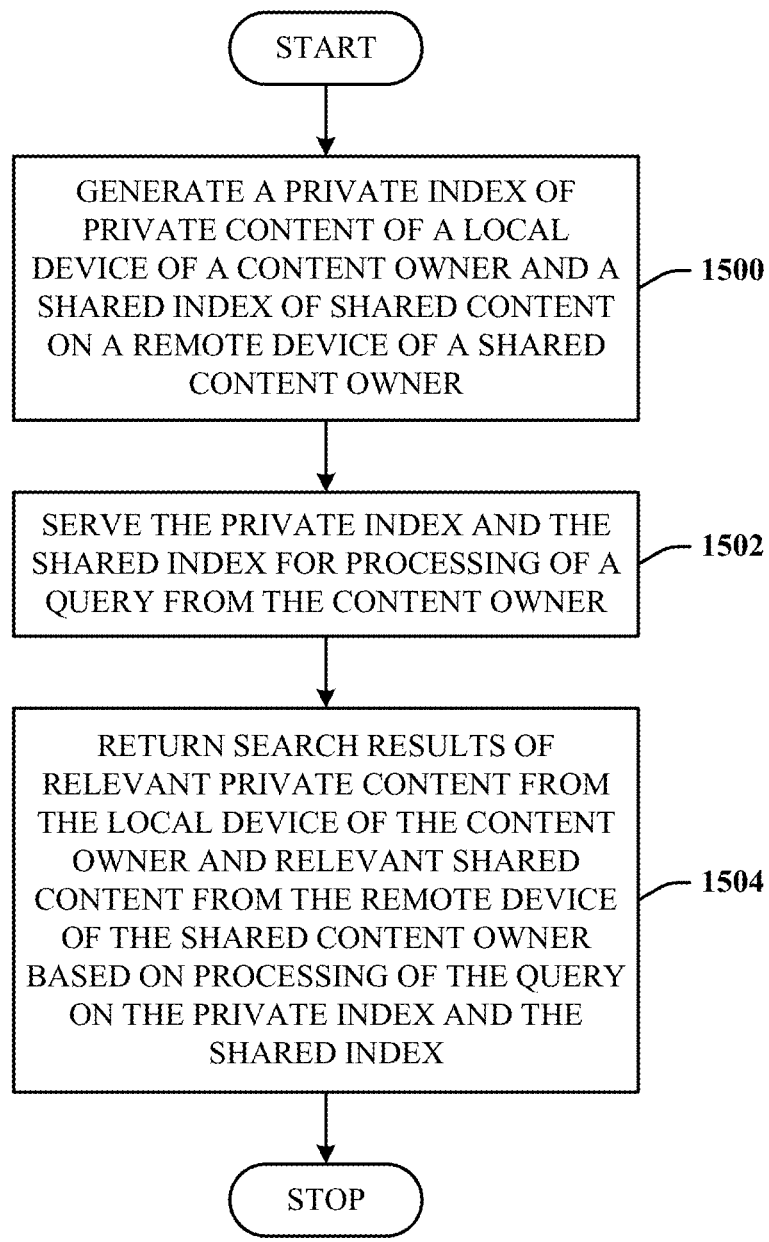
FIG. 15 illustrates a method in accordance with the disclosed architecture.

FIG. 15 illustrates a method in accordance with the disclosed architecture. At 1500, a private index of private content of a local device of a content owner is generated and a shared index of shared content on a remote device of a shared content owner is generated. The private index can be an index of private user documents accessibly only by the user. The private index is then processed to return only private relevant content to the user of the local device and no other user in the pervasive network. At 1502, the private index and the shared index are served (made accessible) for processing of a query from the content owner. At 1504, search results of relevant private content from the local device of the content owner and relevant shared content from the remote device of the shared content owner are returned based on processing of the query on the private index and the shared index.

The method can further comprise processing the query against the private index and the shared index, and against a web index, and returning web results along with the relevant private content and the relevant shared content for presentation to the content owner. The method can further comprise processing the query on the local device of the content owner and against the private index, and processing the query on the remote device of the shared content owner and against the shared index. The method can further comprise merging the private index and the shared index to create a merged index, and storing the merged index in a network storage location for access and processing by a search engine to return the search results. In this way, the merged indexed is highly available for access from any user device.

The method can further comprise forwarding the query from the remote device of the shared content owner to another remote device (not the local device) of another shared content owner, processing the query against another shared index of the another remote device, and returning relevant content from the another remote device to the remote device of the shared content owner. The method can further comprise cloning the private index and shared index on other pervasive network devices.

Figure 16:
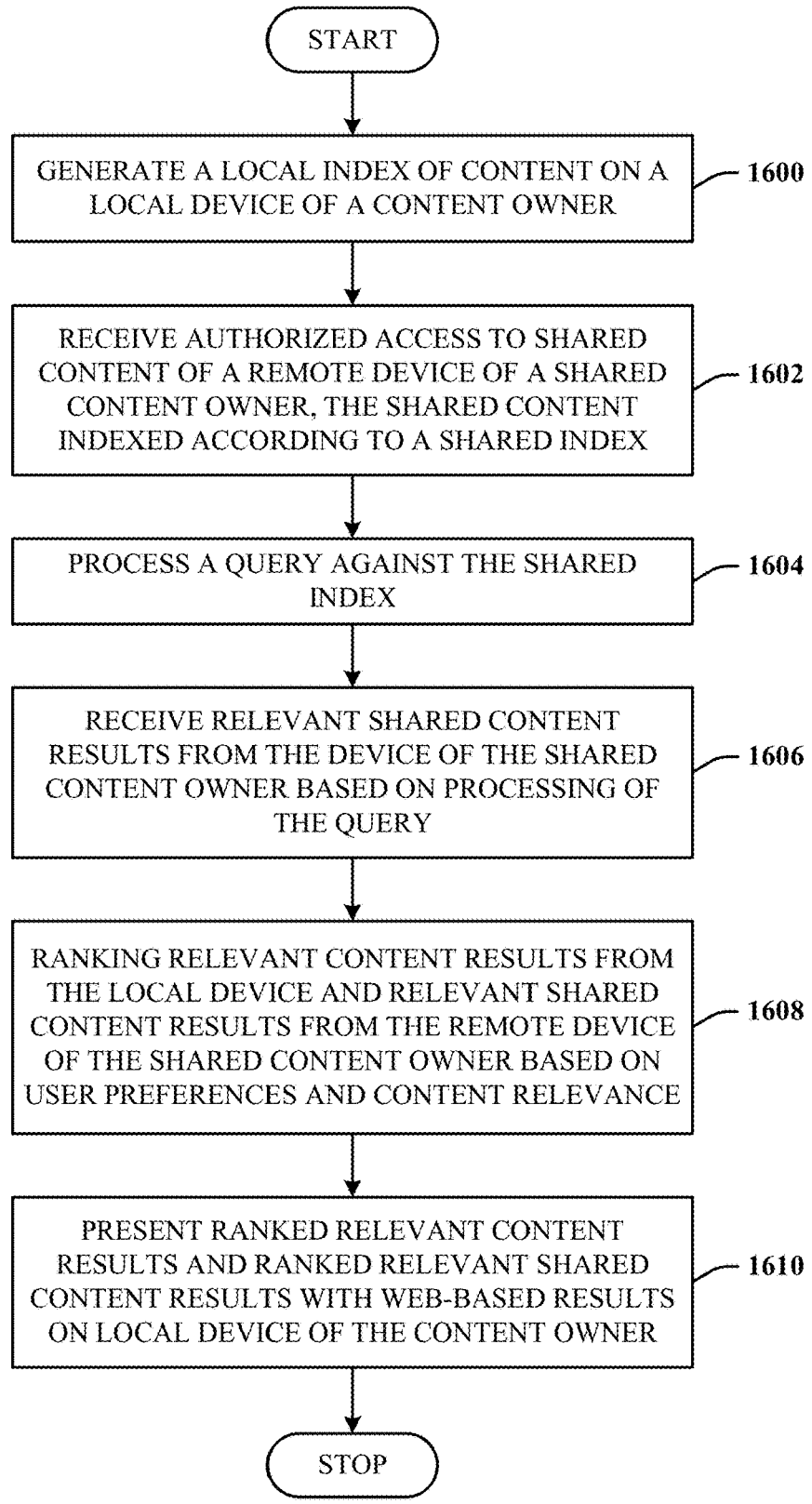
FIG. 16 illustrates an alternative method in accordance with the disclosed architecture.

FIG. 16 illustrates an alternative method in accordance with the disclosed architecture. A computer-readable storage medium comprises computer-executable instructions that when executed by a microprocessor, cause the microprocessor to perform the following acts. At 1600, a local index of content on a local device of a content owner is generated. At 1602, authorized access is received to shared content of a remote device of a shared content owner, the shared content indexed according to a shared index. At 1604, a query is processed against the local index and the shared index. At 1606, relevant content results of the local device and relevant shared content results from the remote device of the shared content owner are received based on processing of the query. At 1608, the relevant content results from the local device and relevant shared content results from the remote device of the shared content owner are ranked based on user preferences and content relevance. At 1610, the ranked relevant content results and ranked relevant shared content results are presented with web-based results on the local device of the content owner.

The computer-readable storage medium can further comprise instructions for receiving the relevant shared content results from the remote device based on at least one of proximity of the local device to the remote device, quality measure of the relevant shared content of the remote device, relevance of the share content of the remote device or confidence measure of the shared content owner. The computer-readable storage medium can further comprise instructions for indexing realtime data of the remote device and serving the realtime data index to an incoming query. The computer-readable storage medium can further comprise instructions for distributing and caching the local index and the shared index among multiple devices. The computer-readable storage medium can further comprise instructions for sending the query from the local device directly to the remote device and other accessible remote devices, processing the query on each of the remote device and the other accessible remote devices, and receiving back at the local device relevant content results from any one or more of the remote device and the other accessible remote devices.

As used in this application, the terms "component" and "system" are intended to refer to a computer-related entity, either hardware, a combination of software and tangible hardware, software, or software in execution. For example, a component can be, but is not limited to, tangible components such as a microprocessor, chip memory, mass storage devices (e.g., optical drives, solid state drives, and/or magnetic storage media drives), and computers, and software components such as a process running on a microprocessor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 17:
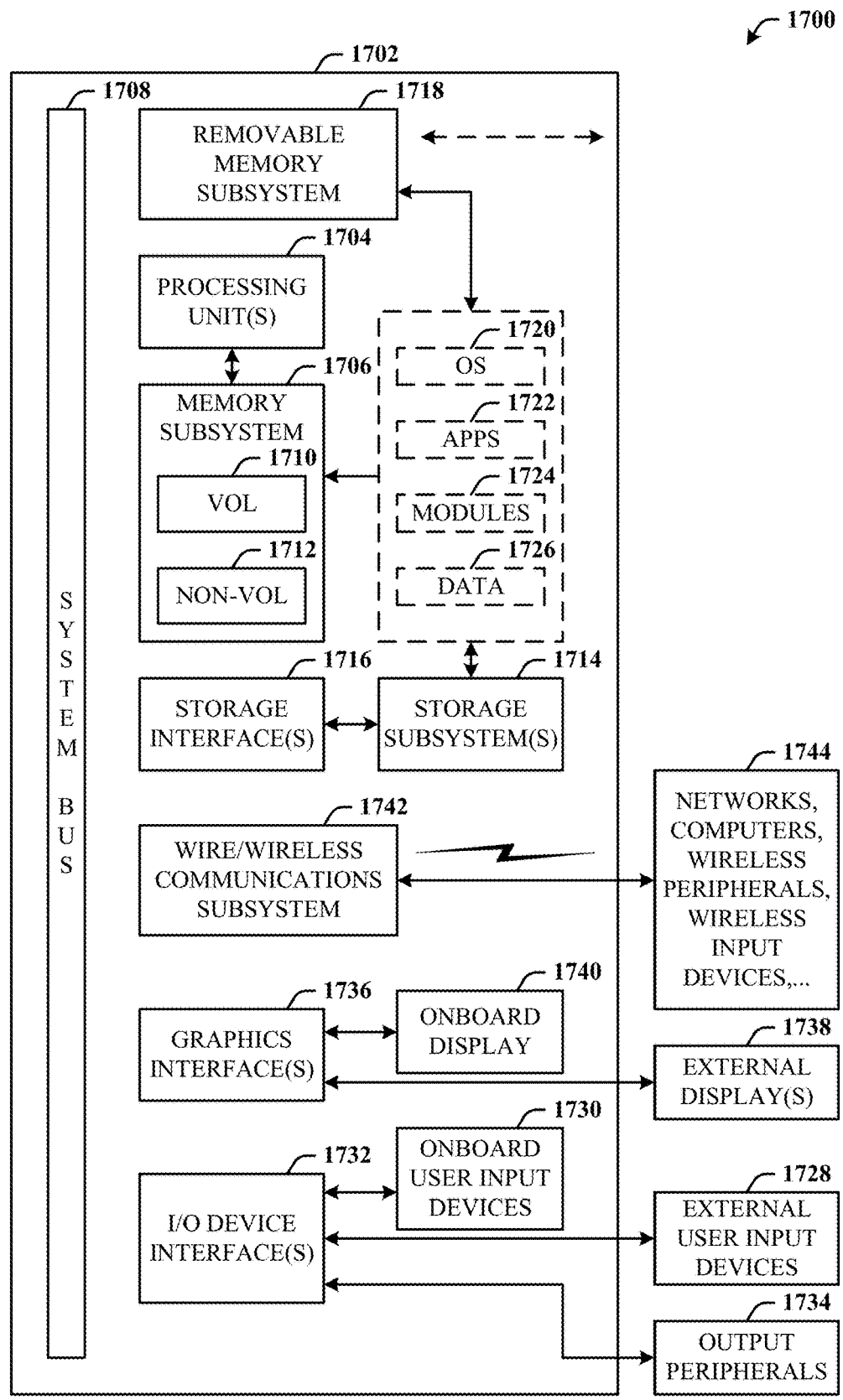
FIG. 17 illustrates a block diagram of a computing system that executes pervasive search computing in accordance with the disclosed architecture.

Referring now to FIG. 17, there is illustrated a block diagram of a computing system 1700 that executes pervasive search computing in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 17 and the following description are intended to provide a brief, general description of the suitable computing system 1700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1700 for implementing various aspects includes the computer 1702 having microprocessing unit(s) 1704 (also referred to as microprocessor(s) and processor(s)), a computer-readable storage medium such as a system memory 1706 (computer readable storage medium/media also include magnetic disks, optical disks, solid state drives, external memory systems, and flash memory drives), and a system bus 1708. The microprocessing unit(s) 1704 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 1702 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 1706 can include computer-readable storage (physical storage) medium such as a volatile (VOL) memory 1710 (e.g., random access memory (RAM)) and a non-volatile memory (NON-VOL) 1712 (e.g., ROM, EPROM, EEPROM, etc.). A basic input/output system (BIOS) can be stored in the non-volatile memory 1712, and includes the basic routines that facilitate the communication of data and signals between components within the computer 1702, such as during startup. The volatile memory 1710 can also include a high-speed RAM such as static RAM for caching data.

The system bus 1708 provides an interface for system components including, but not limited to, the system memory 1706 to the microprocessing unit(s) 1704. The system bus 1708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1702 further includes machine readable storage subsystem(s) 1714 and storage interface(s) 1716 for interfacing the storage subsystem(s) 1714 to the system bus 1708 and other desired computer components and circuits. The storage subsystem(s) 1714 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 1716 can include interface technologies such as EIDE, ATA, SATA, and IEEE 1394, for example.

One or more programs and data can be stored in the memory subsystem 1706, a machine readable and removable memory subsystem 1718 (e.g., flash drive form factor technology), and/or the storage subsystem(s) 1714 (e.g., optical, magnetic, solid state), including an operating system 1720, one or more application programs 1722, other program modules 1724, and program data 1726.

The operating system 1720, one or more application programs 1722, other program modules 1724, and/or program data 1726 can include items and components of the system 100 of FIG. 1, items and components of the system 200 of FIG. 2, items and components of the system 300 of FIG. 3, items and components of the system 400 of FIG. 4, items and components of the indexer component 600 of FIG. 6, items and components of the index serve system 700 of FIG. 7, items and components of the system 800 of FIG. 8, items and components of the index interface 900 of FIG. 9, items and components of the user interface 1000 of FIG. 10, items and components of the user interface 1100 of FIG. 11, the pervasive results 1200 of FIG. 12, and the methods represented by the flowcharts of FIGS. 13-16, for example.

Generally, programs include routines, methods, data structures, other software components, etc., that perform particular tasks, functions, or implement particular abstract data types. All or portions of the operating system 1720, applications 1722, modules 1724, and/or data 1726 can also be cached in memory such as the volatile memory 1710 and/or non-volatile memory, for example. It is to be appreciated that the disclosed architecture can be implemented with various commercially available operating systems or combinations of operating systems (e.g., as virtual machines).

The storage subsystem(s) 1714 and memory subsystems (1706 and 1718) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 1702, and include volatile and non-volatile internal and/or external media that is removable and/or non-removable. For the computer 1702, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 1702, programs, and data using external user input devices 1728 such as a keyboard and a mouse, as well as by voice commands facilitated by speech recognition. Other external user input devices 1728 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 1702, programs, and data using onboard user input devices 1730 such a touchpad, microphone, keyboard, etc., where the computer 1702 is a portable computer, for example.

These and other input devices are connected to the microprocessing unit(s) 1704 through input/output (I/O) device interface(s) 1732 via the system bus 1708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1732 also facilitate the use of output peripherals 1734 such as printers, audio devices, camera devices, and so on, such as a sound card and/or onboard audio processing capability.

One or more graphics interface(s) 1736 (also commonly referred to as a graphics processing unit (GPU)) provide graphics and video signals between the computer 1702 and external display(s) 1738 (e.g., LCD, plasma) and/or onboard displays 1740 (e.g., for portable computer). The graphics interface(s) 1736 can also be manufactured as part of the computer system board.

The computer 1702 can operate in a networked environment (e.g., IP-based) using logical connections via a wired/wireless communications subsystem 1742 to one or more networks and/or other computers. The other computers can include workstations, servers, routers, personal computers, microprocessor-based entertainment appliances, peer devices or other common network nodes, and typically include many or all of the elements described relative to the computer 1702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1702 connects to the network via a wired/wireless communication subsystem 1742 (e.g., a network interface adapter, onboard transceiver subsystem, etc.) to communicate with wired/wireless networks, wired/wireless printers, wired/wireless input devices 1744, and so on. The computer 1702 can include a modem or other means for establishing communications over the network. In a networked environment, programs and data relative to the computer 1702 can be stored in the remote memory/storage device, as is associated with a distributed system. It will be appreciated that the network connections shown are exemplary and other means of establishing a communications link between the computers can be used.

The computer 1702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
   a processor; and
   memory storing instructions that, when executed by the processor, cause the processor to perform acts comprising:
   receiving, over a network connection, a query from a computing device operated by a first user;
   conducting a first search over a computer-readable search engine index of a search engine based upon the query, wherein the search engine index indexes first items that are publicly available;
   identifying a first item in the first items indexed in the search engine index as being relevant to the query based upon the first search;
   conducting a second search over a computer-readable personal content index of a second user based upon the query, wherein the personal content index of the second user indexes second items that are not publicly available, where the second items are indexed in the personal content index due to the second items having been previously identified by the second user as being shareable with the first user, and further wherein the personal content index is separate from the search engine index;
   identifying a second item in the second items indexed in the personal content index as being relevant to the query based upon the second search; and
   returning, over the network connection and based upon the first item and the second item being identified as being relevant to the query, search results to the computing device, the search results comprising a first identifier for the first item and a second identifier for the second item.

2. The computing system of claim 1, wherein the second item is an image captured by a camera of the second user.

3. The computing system of claim 1, wherein the first identifier is presented in a first region of a display of the computing device, wherein the second identifier is presented in a second region of the display of the computing device, wherein the first identifier is shown in the first region due to the first item being indexed in the search engine index, wherein the second identifier is shown in the second region due to the second item being indexed in the personal content index.

4. The computing system of claim 1, wherein the personal content index indexes a third item that has previously been identified by the second user as being shareable with a third user but not sharable with the first user, wherein the search results fail to include an identifier for the third item regardless as to whether the third item is relevant to the query.

5. The computing system of claim 1, the acts further comprising:
subsequent to returning the search results, receiving an indication that the second user has identified a third item as being shareable with the first user; and
based upon the indication, updating the personal content index to index the third item.

6. The computing system of claim 1, wherein the second item is stored on a device of the second user.

7. The computing system of claim 1, wherein the second item is stored in data storage that is remote from both the computing device and a second computing device operated by the second user.

8. The computing system of claim 1, wherein the second item is identified in the search results as being shared by the second user with the first user.

9. The computing system of claim 1, wherein the first identifier and the second identifier are displayed simultaneously on a display of the computing device.

10. A method executed by a processor of a computing system, the method comprising:
receiving, over a network connection, a query from a computing device operated by a first user;
conducting a first search over a search engine index of a search engine based upon the query, wherein the search engine index indexes a first item that is publicly available;
identifying the first item as being relevant to the query based upon the first search;
conducting a second search over a personal content index of a second user based upon the query, wherein the personal content index of the second user is separate from the search engine index, and further wherein the personal content index of the second user indexes a second item that is not publicly available, but is labeled as having been identified by the second user as being shareable with the first user;
identifying the second item as being relevant to the query based upon the second search; and
returning, over the network connection and based upon the first item and the second item being identified as being relevant to the query, search results to the computing device, the search results comprising a first identifier for the first item and a second identifier for the second item.

11. The method of claim 10, wherein the first user and the second user are members of a computer-implemented social network, the method further comprising:
prior to conducting the second search over the personal content index, validating access of the first user to the personal content index based upon a degree of separation between the first user and the second user within the computer-implemented social network.

12. The method of claim 10, further comprising:
computing a confidence measure indicative of a likelihood that the second item indexed in the personal content index is relevant to the query, wherein the second item is identified as being relevant to the query when the confidence measure exceeds a threshold value.

13. The method of claim 10, wherein the first user is a customer, wherein the second user is a retailer, wherein the second item is a product of the retailer.

14. The method of claim 10, further comprising:
prior to returning the search results to the computing device, ranking the first item and the second item based upon preferences of the first user, wherein the first item and the second item are presented on a display of the computing device in an order based upon the ranking.

15. The method of claim 10, wherein conducting the second search over the personal content index comprises submitting the query to a compute node executing on a second computing device of the second user, wherein the compute node processes the query against the personal content index, wherein the compute node returns the second identifier to the computing system.

16. The method of claim 10, wherein first item comprises a first image from a web site, wherein the second item comprises a second image stored on data storage of a second computing device of the second user.

17. The method of claim 10, wherein the second item is stored in data storage that is remote from both the computing device and a second computing device operated by the second user.

18. A non-transitory computer-readable storage medium comprising instructions that, when executed by a processor of a computing system, cause the processor to perform acts comprising:
receiving, over a network connection, a query from a computing device operated by a first user;
conducting a first search over a search engine index of a search engine based upon the query, wherein the search engine index indexes a first item that is publicly available;
identifying the first item as being relevant to the query based upon the first search;
conducting a second search over a personal content index of a second user based upon the query, wherein the personal content index of the second user is separate from the search engine index, and further wherein the personal content index of the second user indexes a second item that is not publicly available, but has a label assigned thereto that indicates that the second item has been identified by the second user as being shareable with the first user;
identifying the second item as being relevant to the query based upon the second search; and
returning, over the network connection and based upon the first item and the second item being identified as being relevant to the query, search results to the computing device, the search results comprising a first identifier for the first item and a second identifier for the second item.

19. The non-transitory computer-readable storage medium of claim 18, wherein the personal content index indexes at least one of:
photos;
videos;
text documents;
spreadsheets
audio; or
emails.

20. The non-transitory computer-readable storage medium of claim 18, wherein the computing device is a smartphone.

* * * * *